United States Patent
Southall

(10) Patent No.: US 10,689,062 B2
(45) Date of Patent: Jun. 23, 2020

(54) BICYCLE REAR WHEEL SUSPENSION SYSTEM

(71) Applicant: VASTTECH IP PTY LTD, Clarence Park, South Australia (AU)

(72) Inventor: Timothy James Southall, Clarence Park (AU)

(73) Assignee: VASTTECH IP PTY LTD, South Australia (AU)

( * ) Notice: Subject to any disclaimer, the term of this patent is extended or adjusted under 35 U.S.C. 154(b) by 304 days.

(21) Appl. No.: 15/321,447

(22) PCT Filed: Jun. 25, 2015

(86) PCT No.: PCT/AU2015/000366
§ 371 (c)(1),
(2) Date: Dec. 22, 2016

(87) PCT Pub. No.: WO2015/196242
PCT Pub. Date: Dec. 30, 2015

(65) Prior Publication Data
US 2017/0151996 A1     Jun. 1, 2017

(30) Foreign Application Priority Data

Jun. 25, 2014 (AU) ............................. 2014902432
Jan. 21, 2015 (AU) ............................. 2015900173
Feb. 28, 2015 (AU) ............................. 2015900792

(51) Int. Cl.
*B62K 25/28* (2006.01)
*B62K 25/04* (2006.01)

(52) U.S. Cl.
CPC .............. *B62K 25/28* (2013.01); *B62K 25/04* (2013.01); *B62K 2201/08* (2013.01)

(58) Field of Classification Search
CPC ...... B62K 25/28; B62K 25/04; B62K 2201/08
(Continued)

(56) References Cited

U.S. PATENT DOCUMENTS 3,977,697 A * 8/1976 MacPike ............. B62K 25/286
280/284
4,440,413 A * 4/1984 Miyakoshi ........... B62K 25/286
180/227

(Continued)

OTHER PUBLICATIONS

Southall, PCT/AU2015/000366. Written Opinion (dated Aug. 10, 2015).

*Primary Examiner* — Jacob D Knutson
(74) *Attorney, Agent, or Firm* — Loza & Loza, LLP; Heidi L. Eisenhut

(57) ABSTRACT

A bicycle rear wheel suspension systems. In one aspect, a bicycle rear wheel suspension system is provided comprising a bicycle rear wheel suspension system comprising a frame comprising a bottom bracket and a first chain stay, the system further comprising a rear wheel comprising an axle, and a first linkage member pivotally connected with respect to the first chain stay at a first main pivot point, the first linkage member extending rearwardly to bridge the main pivot point and the axle, wherein the main pivot point is in a position higher than the bottom bracket, and closer to the axle than it is to the bottom bracket, and wherein at least the first linkage member further comprises a pivotable connection point for a shock absorbing mechanism bridging this connection point and a portion of a remainder of the frame. Further, a bicycle comprising the rear wheel suspension system is provided.

17 Claims, 10 Drawing Sheets

(58) Field of Classification Search
 USPC .......................................................... 280/284
 See application file for complete search history.

(56) References Cited

U.S. PATENT DOCUMENTS

| | | | | |
|---|---|---|---|---|
| 5,509,679 | A * | 4/1996 | Leitner | B62K 25/286 |
| | | | | 280/261 |
| 6,036,213 | A | 3/2000 | Busby | |
| 6,439,593 | B1 * | 8/2002 | Tseng | B62K 25/10 |
| | | | | 280/284 |
| 6,866,281 | B2 * | 3/2005 | Chamberlain | B62K 25/286 |
| | | | | 280/284 |
| 2003/0193163 | A1 * | 10/2003 | Chamberlain | B62K 3/04 |
| | | | | 280/284 |
| 2005/0046144 | A1 | 3/2005 | Chamberlain et al. | |
| 2011/0233893 | A1 * | 9/2011 | Buckley | B62K 25/286 |
| | | | | 280/284 |
| 2011/0285106 | A1 * | 11/2011 | Talavasek | B62K 25/286 |
| | | | | 280/284 |
| 2012/0223504 | A1 * | 9/2012 | Antonot | B62K 25/286 |
| | | | | 280/284 |
| 2013/0249188 | A1 | 9/2013 | Beale | |
| 2014/0001729 | A1 * | 1/2014 | Hudec | B62K 25/28 |
| | | | | 280/283 |
| 2014/0103617 | A1 * | 4/2014 | Chamberlain | B62K 25/286 |
| | | | | 280/284 |
| 2017/0240243 | A1 * | 8/2017 | Goes | B62K 25/286 |
| 2018/0194428 | A1 * | 7/2018 | Hudec | B62K 25/286 |
| 2018/0273136 | A1 * | 9/2018 | Voss | B62K 25/283 |

* cited by examiner

BICYCLE REAR WHEEL SUSPENSION SYSTEM

PRIORITY DOCUMENTS

The present application claims priority from each of:

Australian Provisional Patent Application No. 2014902432 titled "A BICYCLE REAR WHEEL SUSPENSION SYSTEM" and filed on 25 Jun. 2014;

Australian Provisional Patent Application No. 2015900173 titled "A BICYCLE REAR WHEEL SUSPENSION SYSTEM" and filed on 21 Jan. 2015; and Australian Provisional Patent Application No. 2015900792 titled "A BICYCLE REAR WHEEL SUSPENSION SYSTEM" and filed on 28 Feb. 2015;

the content of each of which is hereby incorporated by reference in its entirety.

TECHNICAL FIELD

The present disclosure relates to bicycle rear wheel suspension systems, and to a bicycle comprising such a system. In a particular form the present disclosure relates to a linkage and a pivot arrangement for a rear wheel suspension system of a bicycle such as a mountain bike, downhill bike or cross-country bike.

BACKGROUND

The simplest type of bicycle rear wheel suspension is known as 'single pivot' suspension system. A single pivot suspension system comprises a chain stay or swing arm that pivots about a main pivot point near a bottom bracket or on a seat tube of a bike frame. A second pivot point may be located near a rear wheel axle and a shock absorber is normally connected to the top tube. A single pivot suspension is simple and lightweight, however usually suffers from the drawback of having a very progressive (rising rate) shock leverage ratio and excessive lateral flexure. The shock leverage ratio is defined as the ratio of rear wheel travel to shock travel. The shock leverage ratio may be constant throughout suspension travel (linear) or variable throughout suspension travel (progressive or regressive). A progressive (rising rate) shock leverage ratio means that the shock becomes harder to compress further into the suspension travel. A very progressive leverage ratio can mean that the full available travel of the suspension is not used.

Suspension designers have found that improved suspension performance is gained by a suspension system having a close to linear shock leverage ratio combined with a progressive air shock. Using an air shock instead of a coil spring shock reduces the weight of the suspension. For the simple single pivot design described above, because the suspension is usually very progressive, a coil spring must be used (which is usually linear) for reasonable suspension results, and this is accompanied by a weight penalty.

To obtain a more desirable shock leverage ratio, most modern bike rear wheel suspension systems use a rocker link mounted to the seat tube or top tube and pivotally connected to the shock. The rocker link can be designed to allow the shock to be connected to the bike's top tube, down tube, or orientated in a near vertical position connected to the main frame near the bottom bracket. An air shock can also usually be used with a rocker link design. An example of such a suspension system is a 'linkage driven single pivot' also known as 'four bar'. A four bar suspension has a main pivot point positioned on the frame above the bottom bracket. A second set of pivot points are located on the seat stay near the rear axle. The seat stay is also pivotally connected to the rocker link A variation of this system is the 'Horst link' or 'FSR' design, whereby the second set of pivot points are located on the chain stays instead of the seat stays. Locating the second set of pivots at the rear wheel axle is known as a 'Split pivot' or 'Active braking pivot'. While each of the above suspension systems can offer a more desirable shock leverage ratio compared to a simple single pivot, the disadvantage is that the rocker link adds weight, complexity and increases manufacturing cost.

Another variation of the above described suspension system is known as a 'flex stay'. In a 'flex stay' system, the second rear set of pivots is eliminated and the rear triangle is designed to have some flex in the vertical plane to accommodate the changing angles of the rear triangle through suspension travel. A drawback of obtaining flex in the vertical plane is that invariably a degree of twist or flex in the horizontal direction will exist. Horizontal flex in the rear triangle is felt as slop, which is detrimental to bike handling, and increased flex can lead to material fatigue and shortened lifespan of the frame. Despite these drawbacks, the 'flex stay' system does eliminate a pair of pivot points which reduces the unsprung weight of the bike.

In addition to the shock leverage ratio, there are other suspension parameters that designers seek to optimise, including for example the rear wheel travel path. The 'Virtual Pivot Point (VPP)' and 'DW link' are two such systems that were developed in order to optimise the rear wheel travel path. By allowing the rear wheel to travel rearwards and upwards for the initial part of the shock movement, these designs can be more efficient at absorbing small bumps, particularly square edged bumps. This rear wheel travel path is achieved by having two sets of main pivot points somewhere near the bottom bracket. This creates a tighter radius for the rear wheel to rotate around. These designs usually feature the same number of pivot points as a Four Bar, Horst link, or Split pivot system. There is a disadvantage to these designs however, as pivot points gradually wear and develop a small amount of slop. This can allow a small amount of side to side play to be felt at the rear wheel. This amount of unwanted play can be measured at the rear wheel as a measure of the degree of slop in the pivot multiplied by the distance between the pivot point and the rear wheel axle. This problem obviously exists in every design, but with two sets of pivot points between the main frame and the rear wheel axle, the potential slop is nearly doubled.

It is against this background and the problems and difficulties associated therewith that the present invention has been developed.

Certain objects and advantages of the present invention will become apparent from the following description, taken in connection with the accompanying drawings, wherein, by way of illustration and example, an embodiment of the present invention is disclosed.

SUMMARY

According to a first aspect of the present invention, there is provided a bicycle rear wheel suspension system comprising a frame comprising a bottom bracket and a first chain stay, the system further comprising a rear wheel comprising an axle, and a first linkage member pivotally connected with respect to the first chain stay at a first main pivot point, the first linkage member extending rearwardly to bridge the main pivot point and the axle, wherein the main pivot point is in a position higher than the bottom bracket, and closer to the axle than it is to the bottom bracket, and wherein at least the first linkage member further comprises a pivotable connection point for a shock absorbing mechanism bridging this connection point and a portion of a remainder of the frame.

In one form, the first main pivot point, the axle, and the pivotable connection point for the shock absorbing mechanism comprise a triangular geometry on the first linkage member.

In one form, the pivotable connection point for the shock absorbing mechanism is higher than the main pivot point. In one form, in an alternative, the pivotable connection point for the shock absorbing mechanism is not higher than the main pivot point.

In one form, the axle is rearward of the pivotable connection point for the shock absorbing mechanism.

In one form, the first linkage member is a triangular shaped member comprising the first main pivot point at or near a first corner thereof, the axle at or near a second corner thereof, and the pivotable connection point for the shock absorbing mechanism at or near a third corner thereof.

In one form, the frame further comprises a second chain stay, and wherein the system further comprises a second linkage member pivotally connected with respect to the second chain stay at a second main pivot point, where the second main pivot point is substantially identically positioned as, and aligned with, the first main pivot point, and wherein the second linkage member extends rearwardly, to bridge the second main pivot point and the axle.

In one form, the first and second linkage members are substantially identical.

In one form, the first and second linkage members are dissimilar.

In one form, the second linkage member does not comprise a pivotable connection point for the shock absorbing mechanism.

In one form, the shock absorbing mechanism bridges its pivotable connection point with the or each linkage member, and a further pivotable connection with respect to a top tube of the frame.

In one form, the shock absorbing mechanism bridges its pivotable connection point with the or each linkage member, and a further pivotable connection with respect to a down tube of the frame.

In one form, the shock absorbing mechanism bridges its pivotable connection point with the or each linkage member, and a further pivotable connection with respect to a seat stay of the frame.

In one form, the shock absorbing mechanism bridges its pivotable connection point with the or each linkage member, and a further pivotable connection with respect to the bottom bracket of the frame.

In one form, the shock absorbing mechanism comprises a shock absorber.

In one form, the shock absorber comprises an air shock.

In one form, the shock absorbing mechanism comprises at least one shock absorber linkage bridging the shock absorber and one of either of the shock absorbing mechanism's pivotable connection point with the or each linkage member, or the further pivotable connection.

In one form, one side of the system comprises a sprung first chain stay, a sprung first seat stay, an unsprung first linkage member, and the shock absorbing mechanism, while an opposing side features a sprung second chain stay, a sprung second seat stay, and an unsprung second linkage member.

In one form, one side of the system comprises a sprung first chain stay, an unsprung first linkage member, and the shock absorbing mechanism, while the opposing side features a sprung second chain stay, and an unsprung second linkage member.

In one form, one side of the system comprises a sprung first chain stay, a sprung first seat stay, an unsprung first linkage member, and the shock absorbing mechanism, while the opposing side features a sprung second chain stay, and an unsprung second linkage member.

In one form, one side of the system comprises a sprung chain stay, a sprung seat stay, an unsprung first linkage member, and the shock absorbing mechanism, while the opposing side features none of those things.

In one form, one side of the system comprises a sprung chain stay, an unsprung first linkage member, and the shock absorbing mechanism, while the opposing side features none of those things.

In one form, a drive side of the system comprises at least one cog which serves as a part of a drive train, the or each cog being rotatably connected with respect to the chain stay on the line of the first main pivot point.

In one form, the or each chain stay is raised above the level of the chain.

According to a further aspect, there is provided a bicycle comprising the bicycle suspension system described herein.

According to a further aspect, there is provided a bicycle comprising a frame comprising a bottom bracket and a first chain stay, the bicycle further comprising a rear wheel suspension system comprising a rear wheel comprising an axle, and a first linkage member pivotally connected with respect to the first chain stay at a first main pivot point, the first linkage member extending rearwardly to bridge the main pivot point and the axle, wherein the main pivot point is in a position higher than the bottom bracket, and closer to the axle than it is to the bottom bracket, and wherein at least the first linkage member further comprises a pivotable connection point for a shock absorbing mechanism bridging this connection point and a portion of a remainder of the frame.

According to a further aspect, there is provided a bicycle rear wheel suspension system, including:

a rear wheel having a rear wheel axle;

a frame including a bottom bracket from which a first and second chain stay extend rearward about opposing sides of the rear wheel;

a first linkage member rotatably connected to a first side of the rear wheel axle and pivotally connected to the first chain stay and a first end of a first seat stay;

a second linkage member rotatably connected to a second side of the rear wheel axle and pivotally connected to both a terminal end of the second chain stay and a first end of a second seat stay, the first and second seat stays disposed about opposing sides of the rear wheel; and a shock absorbing mechanism coupled between the seat stays and the frame which is compressed throughout suspension travel as the rear wheel axle traverses relative to the terminal ends of the first and second chain stays.

In one form, a pair of main pivot points are defined by the connections between the first and second linkage members to the first and second chain stays and the horizontal distance from a vertical plane through the centre of each main pivot point to a vertical plane through the centre of the rear wheel axle is less than the horizontal distance between the vertical plane through the centre of each main pivot point and a vertical plane through the centre of the bottom bracket.

In one form, the horizontal distance between the vertical plane through the centre of the bottom bracket and the vertical plane through the centre of each main pivot point is greater than 75 mm.

In one form, the first and second linkage members are triangular shaped linkage members.

In one form, the rear wheel axle travel path throughout suspension travel is characterised as having an initial section that is generally rearward and upward, an intermediate section that is vertically upward and a final section that is forward and upward.

In one form, the first and second seat stays converge to form a U-shaped member having a single end that is fixedly connected to a first end of the shock absorbing mechanism.

In one form, the first and second seat stays converge to form a U-shaped member having a single end that is pivotally connected to a first end of the shock absorbing mechanism.

In one form, the shock absorbing mechanism is generally axially aligned with the top tube.

In one form, a rear portion of the top tube is split to accommodate mounting of the second end of the shock absorbing mechanism in an internal region of the top tube.

In one form, the shock absorber is pivotally connected to a down tube of the frame.

In one form, the seat tube is split to allow passage of the shock absorbing mechanism.

In one form, the shock leverage ratio is substantially linear or slightly progressive throughout suspension travel.

In one form, the shock leverage ratio varies between 1.9 and 2.3 throughout suspension travel.

In one form the suspension system has only five pivot points, including:
  a) a first pivot point in the form of a pivot point between the shock absorbing mechanism and the frame;
  b) a second pivot point in the form of the first main pivot point between the first linkage member and the first chain stay;
  c) a third pivot point in the form of the second main pivot point between the second linkage member and the second chain stay;
  d) a fourth pivot point in the form of the pivot point between the first linkage member and the first end of the shock absorbing mechanism; and
  e) a fifth pivot point in the form of the pivot point between the second linkage member and the first end of the shock absorbing mechanism.

In a further aspect, there is provided a bicycle rear wheel suspension system for isolating movement of a rear wheel from a frame, including:
  a sprung chain stay extending rearward from a bottom bracket of the frame and terminating at a first end;
  an unsprung chain stay pivotally connected to the first end of the sprung chain stay at a first pivot point, the unsprung chain stay rotatably connected to a rear wheel axle of the rear wheel and pivotally connected to a first end of a linkage member at a second pivot point;
  a shock absorber having a first end pivotally connected to the frame and a second end connected to a second end of the linkage member;
  wherein, throughout suspension travel a position of the first pivot point controls a rear wheel travel path and a position of the second pivot point controls the shock leverage ratio of the suspension system.

For ease of description, bicycles embodying the various aspect of the present invention are described below in their usual assembled position as shown in the accompanying drawings and terms such as front, rear, upper, lower, horizontal, longitudinal etc., may be used with reference to this usual position. However, the bicycles may be manufactured, transported, sold, or used in orientations other than that described and shown here.

A detailed description of one or more embodiments of the invention is provided below along with accompanying Figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

BRIEF DESCRIPTION OF DRAWINGS

Embodiments of the present invention will be discussed with reference to the accompanying drawings wherein.

In the following description, like reference characters designate like or corresponding parts throughout the Figures.

DESCRIPTION OF EMBODIMENTS

A conventional bicycle frame geometry includes a rear triangle consisting of a seat tube, a pair of chain stays and a pair of seat stays. The chain stay is a frame element that runs horizontally from a bottom bracket to the rear fork dropouts. The seat stay is a frame element that runs from near a top of the seat tube to the rear fork dropouts.

For the purpose of this specification, the term "chain stay" should be construed as being inclusive of any member, or one or more members connected together, that extend between the bottom bracket and rear wheel axle. If one of said members is integral with the bottom bracket, said member is a sprung chain stay. Any other member forming part of the chain stay, but that is not integral with the bottom bracket is an unsprung chain stay. In certain embodiments, such as that of FIG. 18, the sprung chain stay(s) can connect the bike's rear wheel dropouts to an area above the bottom bracket but significantly lower than the seat stays, either on the middle or lower part of the seat tube or the down tube.

For the purpose of this specification, the term "seat stay" should be construed as being inclusive of any member, or one or more members connected together, that extend in a generally upwardly angled direction from the rear wheel axle, or from a link or member connected to the rear wheel axle towards the seat tube.

Figures 1, 2:
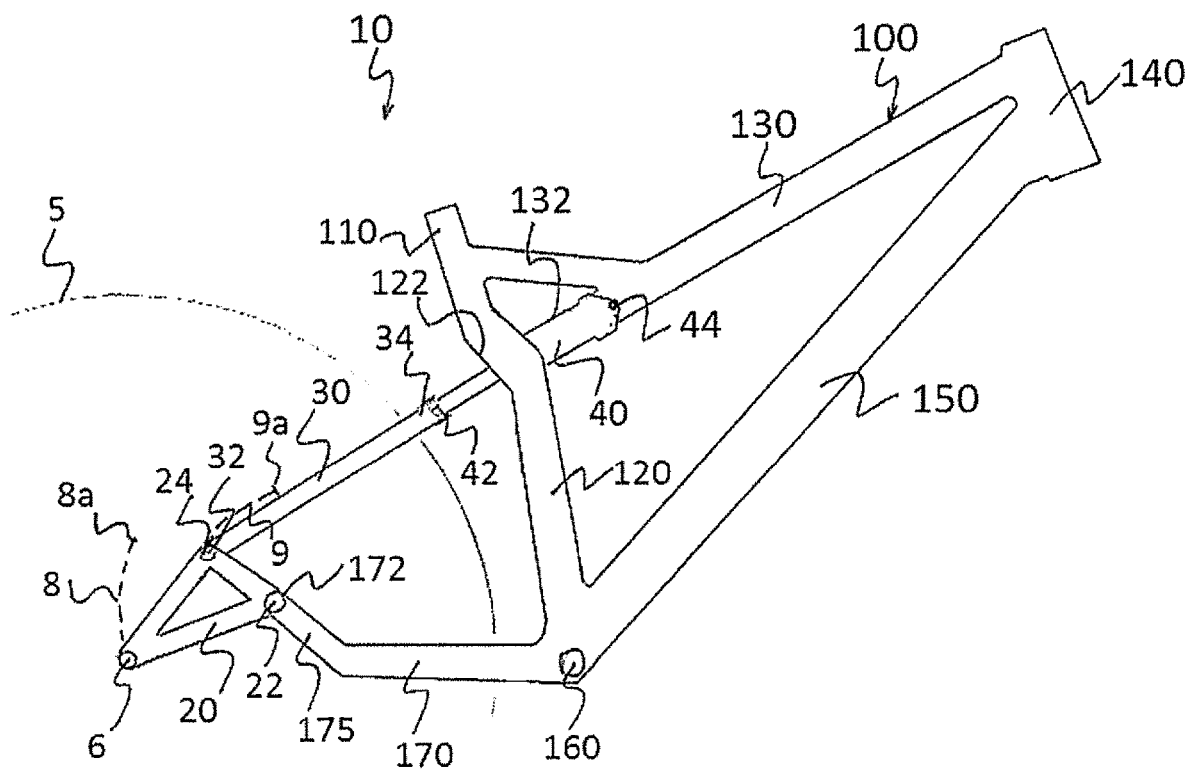
FIG. 1 is a schematic representation of a bicycle rear wheel suspension system according to a first embodiment of the invention.
FIG. 2 is a schematic representation of a bicycle rear wheel suspension system according to a second embodiment of the invention.

Referring now to FIG. 1, there is shown a schematic representation of a bicycle rear wheel suspension system 10 according to an embodiment of the present invention. The suspension system 10 isolates movement of a rear wheel 5 from a frame (or chassis) 100 of the bicycle in order to increase ground traction, speed, control, and improve rider comfort as the bicycle travels over rough terrain, encounters rocks etc.

The frame 100 of the bicycle includes a seat post 110, a seat tube 120, a top tube 130, a head tube 140, a down tube 150, a bottom bracket 160 and a chain stay 170. The chain stay 170 extends rearward from the bottom bracket 160 and has an upwardly angled or curved portion 175 which allows for chain clearance on a drive side of the bicycle (a curved chain stay is only necessary on the drive side of the frame).

The bicycle rear wheel suspension system 10 comprises a first linkage member 20 pivotally connected with respect to the first chain stay 170 at a first main pivot point 22, the first linkage member 20 extending rearwardly to bridge the main pivot point 22 and the axle 6, wherein the main pivot point 22 is in a position higher than the bottom bracket 160, and closer to the axle 6 than it is to the bottom bracket 160, and wherein at least the first linkage member 20 further comprises a pivotable connection point 24 for a shock absorbing mechanism (comprising a seat stay 30 and a shock absorber 40 in this case), bridging this connection point 24 and a portion of a remainder of the frame 100.

The frame 100 and rider form the sprung mass of the suspension. The unsprung mass of the suspension system 10 includes the shock absorbing mechanism, and linkage member 20 which may also be referred to herein as the unsprung chain stay (with chain stay 170 being the sprung chain stay). Linkage member 20 is rotatably connected to the rear wheel axle 6 and pivotally connected to the terminal end 172 of the chain stay 170 and first end 32 of the seat stay 30. The or each main pivot point 22 of the suspension system 10 is defined at the junction between the or each linkage member 20 and chain stay 170. A further pivot point 24 is defined at the junction between the linkage member 20 and the shock absorber mechanism. Linkage member 20 is a triangular shaped structural element.

It is to be noted that for the embodiments shown in FIGS. 1-8, only the drive (i.e. a chain or belt) side components of the suspension system are illustrated and described. Certain components have counterparts on the non-drive side of the bicycle. For example, there are a pair of chain stays that extend rearward about opposing sides of the rear wheel, a pair of seat stays and first and second linkage members disposed about opposing sides of the rear wheel. The invention is, unless otherwise mentioned, described with reference to the drive side components only.

In the embodiment of FIG. 1, the shock absorbing mechanism is positioned in the suspension system 10 between the linkage 20 and the top tube 130 of the frame 100. In order to facilitate passage of the shock 40 of the shock absorbing mechanism through the seat tube 120, the seat tube 120 has a split region 122. The split region 122 allows the shock 40 to pass through the seat tube 120. A first end (extensible or piston end) 42 of the shock 40 is fixedly connected to a second end 34 of the seat stay 30 while a second end 44 of the shock 40 is pivotally connected to the top tube 130. The rear section 132 of the top tube 130 is split allowing the second end 44 of the shock 40 to be mounted at a position inside the top tube 130. In the position illustrated in FIG. 1 (at 0% suspension travel or "at rest" when the shock 40 is fully extended) the shock 40 is axially aligned with the top tube 130.

The main pivot point 22 of the suspension system 10 of FIG. 1 is located considerably more rearward than any known arrangement of the prior art. In the arrangement shown in FIG. 1, the main pivot point 22 is located closer to the rear wheel axle 6 than to the bottom bracket 160. In general terms, the position of the main pivot point 22 may be characterised as being at least 75 mm rearward of the bottom bracket 160. This distance represents the horizontal distance B between a vertical plane Z through the bottom bracket 160 and a vertical plane Y through the centre of the main pivot point 22. For clarity, this is shown in FIG. 2 for all embodiments. Furthermore, horizontal distance A represents the distance between vertical plane Y and a vertical plane X through the centre of the rear wheel axle 6. For all embodiments shown, B is greater than A.

A benefit of locating the main pivot point 22 substantially rearward (at least more than 75 mm behind the bottom bracket), is that the lateral stiffness of the rear wheel is increased which means that the rear wheel tracks in a straight line with minimal side to side slop. Pivot points are inherently a point of slop in a suspension system due to the bearing and bushing mechanisms inside them. As the pivot points wear, this amount of slop increases which reduces lateral stiffness of the rear wheel. When a chain stay is attached to the main pivot point, the slop felt at the rear wheel can be calculated by the degree of lateral movement at the pivot point multiplied by the length of the chain stay. In the suspension system 10 of FIG. 1, the unsprung chain stay length between the rear wheel axle 6 and the main pivot point 22 is less compared to a system whereby the main pivot point 22 is located on the seat tube, for example as in a conventional single pivot suspension design. Having the main pivot point 22 located as shown in FIG. 1 therefore provides for increased lateral stiffness (i.e. less undesired side to side movement) of the rear wheel 5 compared to a single pivot suspension system. The reduced unsprung chain stay length also reduces lateral torque forces acting against the bearings. Torque is a measure of leverage and can be calculated as the sideways force at the rear axle, multiplied by the length of the chain stay till the main pivot is reached. Therefore reducing lateral torque forces on the main pivot points 22 will increase the bearing or bushing life at the pivot point, or provide the option of using lighter and less robust bearings or bushings at the main pivot point 22.

The suspension system 10 of FIG. 1 has a rear wheel or axle travel path 8 as shown with a dashed line. The rear axle travel path 8 is a curve depicting how the rear axle (and wheel) moves throughout suspension travel from "top out" to "bottom out". The bottom out position of the rear wheel axle 6 is shown at position 8a and is reached at 100% suspension travel when the shock 40 is fully compressed. The rear wheel axle travel path 8 throughout suspension travel is characterised as having an initial section that is generally rearward and upward, an intermediate section that is vertically upward and a final section that is forward and upward. This wheel path is considered advantageous because in the initial section the rearward and upward motion allows the suspension to more efficiently absorb small bumps (particularly square edged bumps) which gives the suspension good bump compliance. In the intermediate section when the rear wheel travel path is vertical, the suspension can absorb larger bumps while ensuring the chain stay length does not become excessive. In the final section, the rear wheel 5 moves forward (toward the seat tube 120) and upward which allows the suspension to absorb heavy hits without blowing straight through to bottom out. This advantageous wheel path 8 is achieved by locating the main pivot point 22 closer to the rear axle 6 than to the bottom bracket 160 which enables a tighter path to be prescribed by the axle throughout suspension travel. The benefits of this suspension curve combine superior bump absorption due to more rearward rear axle travel path in the initial part of the suspension movement. Superior pedalling "anti-squat" due to the design having a more rearward axle travel path than contemporary designs at the 25% suspension sag point. This is the percentage of travel the suspension sinks to with a rider pedalling in normal conditions with a correctly set up bike and shock. And reduced overall chain growth which effects rider pedalling efficiency due to pedal "kick back". The unsprung weight of the invention compared to contemporary bike's ranges from slightly lighter, through to dramatically lighter depending on the embodiment of the design. Reduced unsprung weight allows the rear wheel to accelerate out of the bumps more efficiently and less rider momentum is lost due to the impact of the bump—greater bike and rider speed is maintained.

The operation of the suspension system 10 shall now be described. When the rear wheel 5 encounters a bump, the linkage member 20 (and thereby the rear wheel axle 6) will pivot about the main pivot point 22. As linkage member 20 begins to pivot about pivot point 22, a force is imparted at pivot point 24 between the linkage member 20 and the seat stay 30 of the shock absorbing mechanism. This force causes the seat stay 30 to pivot and also move toward the second end 44 of the shock 40. The rigid interconnection between the seat stay 30 and the shock 40 causes the shock 40 to compress and also pivot slightly with respect to the top tube 130 about the second end 44 of the shock 40. Throughout suspension travel (between 0% and 100%) the shock 40 will pivot about second end 44 through an angle of less than 20 degrees, and preferably between about 15-20 degrees. In the arrangement shown in FIG. 1, much of the movement of the shock absorbing mechanism (seat stay 30 and shock 40) throughout suspension travel is axial or translational movement in line with the top tube 130. Unproductive changes in angle are minimised thereby reducing the unsprung weight of the suspension system 10. In many modern suspension designs the shock may rotate more than 30 degrees throughout suspension travel which will tend to increase unsprung weight compared to the present embodiment. Another benefit of maintaining the shock 40 largely in axial alignment with the top tube 130 throughout suspension travel is that less frame reinforcing is required to adequately strengthen the frame 100 to handle forces imparted during compression of the shock 40. Reduced reinforcing offers a weight advantage compared to arrangements where the shock is driven into the frame 100 through non-parallel angles to the attachment structure.

The suspension system 10 of FIG. 1 is further advantageous in that it provides a substantially linear (slightly progressive) shock leverage ratio throughout suspension travel. A substantially linear shock leverage ratio enables use of an air shock for shock absorber 40, which reduces unsprung weight compared to a coil spring as is required in many simple single pivot suspension designs which have a very progressive shock leverage ratio. In the arrangement shown in FIG. 1, the rear wheel 5 has 120 mm vertical travel and the shock 40 has 57 mm of travel. The average or overall shock leverage ratio is therefore approximately 2.11:1. The position of pivot point 24 enables the shock leverage ratio to remain substantially linear or slightly progressive throughout suspension travel. The rate of change of the shock leverage ratio throughout suspension travel is determined by the path prescribed by pivot point 24 relative to the second end 44 of the shock 40 throughout suspension travel. For example, with reference to FIG. 1, as the rear wheel axle 6 begins to move upward, pivot point 24 moves forward and upward along path 9 generally towards the second end 44 of the shock 40 (but not directly towards it). As pivot point 24 moves further into its travel, path 9 begins to curve more toward the second end 44 of the shock 40 until at a bottom out position 9a, pivot point 24 is on a trajectory directly towards the second end 44 of the shock 40. The shock leverage ratio is therefore slightly progressive throughout suspension travel before levelling out to be linear at bottom out. This ideal shock leverage ratio is able to be achieved without the need for a rocker link (and weight and complexity associated with it) that would be found in a VPP/DW link suspension system for example.

The shock leverage ratio may be easily tuned by varying the geometry of linkage member 20. For example, if pivot point 24 is moved forward closer to the seat tube 120 (while the distance between pivot point 24 and the main pivot 22 remains constant) then the path prescribed by pivot point 24 would begin with an upward and forward trajectory at the beginning of suspension travel, transition in a direction towards the second end 44 of the shock 40 before finally ending on a downward and forward trajectory away from the second end 44 of the shock 40. The shock leverage ratio curve would therefore be slightly progressive to begin with before flattening out to linear and then falling slightly toward bottom out.

The overall shock leverage ratio may also be tuned by moving pivot point 24 closer or further away from main pivot point 22. If pivot point 24 is moved closer to pivot point 22 then the amount of rear wheel suspension travel would increase (assuming the same shock is fitted). This would increase the overall shock leverage ratio and require a higher shock pressure to be used. Conversely, if pivot point 24 is moved further away from main pivot point 22 (maintaining the same angle with respect to the rear wheel axle 6) then the amount of rear wheel suspension travel would decrease (again assuming that the same shock is fitted). The overall shock leverage ratio would therefore also be reduced and a lower shock pressure would be required.

The principle of having the main pivot point 22 of a bicycle rear wheel suspension system closer to the rear wheel axle 6 than the bottom bracket 160 or generally at least 75 mm rearward of the bottom bracket 160 may be applied to systems of varying shock absorber and frame configurations.

For example, referring now to FIG. 2, where there is illustrated a suspension system 10a according to a second embodiment, wherein the shock absorber 40 is pivotally attached at a second end 44 to an attachment lug 135 which juts downward from top tube 130 of the frame 100. Those parts of the suspension system 10a (and of subsequent embodiments below) which are identical (or near-identical) to corresponding parts shown in the suspension system 10 of FIG. 1, will be denoted by the same reference numerals and will not be described again in detail.

The top tube 130 of this embodiment therefore does not have to be split in order to accommodate internal mounting of the shock absorber 40. The seat tube 120 shown in FIG. 2 is also not split as the shock absorber 40 is not required to pass through it. The first end 42 of the shock absorber is fixedly connected to the seat stay 30. The first end 42 of the shock absorber 40 is located in a fully extended position forward of the seat tube 120. This is achieved by mounting the second end 44 of the shock 40 further up the top tube 130. The seat stay 30 of FIG. 2 curves around the seat tube 120 in a U-configuration. The rear wheel 5 of the suspension system of FIG. 2 has a 120 mm vertical travel and the shock has 57 mm of travel which provides an overall shock leverage ratio of approximately 2.11:1 throughout suspension travel. The rear wheel travel path has the same characteristics as described in relation to the first embodiment due to the configuration of the main pivot point on the chain stay.

Figure 3:
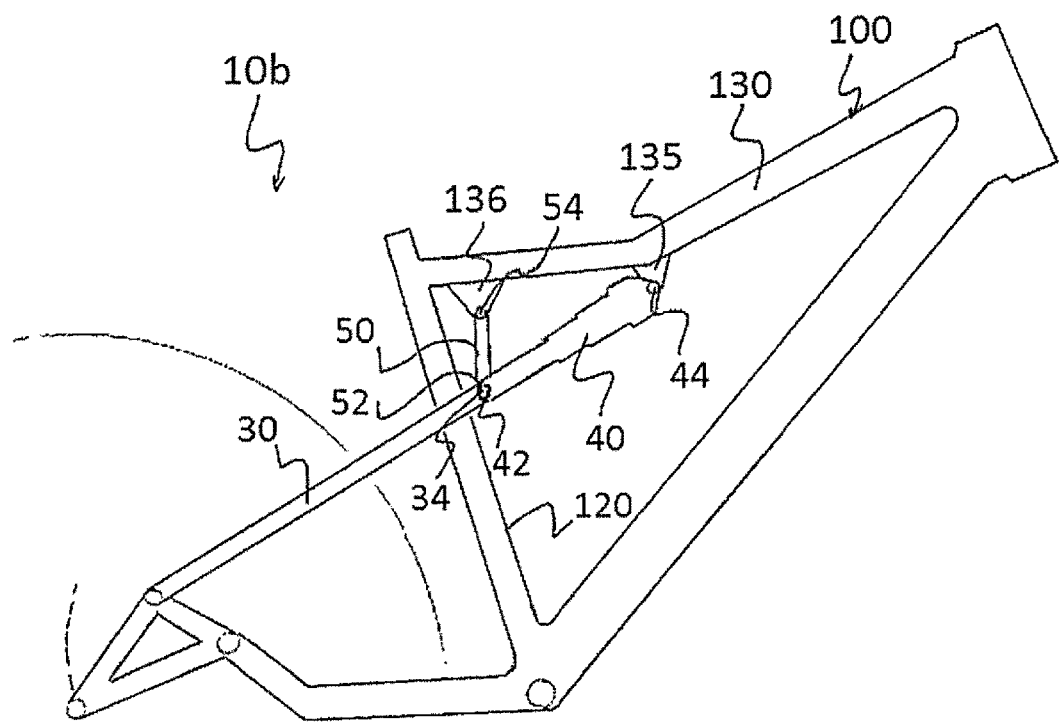
FIG. 3 is a schematic representation of a bicycle rear wheel suspension system according to a third embodiment of the invention.

Referring now to FIG. 3, where there is illustrated a bicycle rear wheel suspension system 10b according to a third embodiment. In this embodiment, a first end 42 of a shock absorber 40 is pivotally connected to seat stay 30 while a second end 44 of the shock 40 is pivotally connected to an attachment lug 135 which juts downward from top tube 130 of the frame 100. In order to control movement of the shock 40, a rocker link 50 is introduced to the suspension system 10. A first end 52 of the rocker link 50 is pivotally connected to the first end 42 of the shock 40 while a second end 54 of the rocker link 50 is pivotally connected to an attachment lug 136 which also juts downward from top tube 130. The rocker link 50 can therefore be used to control the pivoting action of the shock 40 throughout suspension travel. Both the top tube 130 and seat tube 120 are of conventional design (not split). Rocker link 50 is illustrated mounted above the shock 40, although it can also be mounted below the shock 40. The rear wheel 5 of the suspension system of FIG. 3 has a 120 mm vertical travel and the shock has 57 mm of travel which provides an overall shock leverage ratio of approximately 2.11:1 throughout suspension travel. The rear wheel travel path has the same characteristics as described in relation to the first embodiment due to the configuration of the main pivot point on the chain stay.

Figure 4:
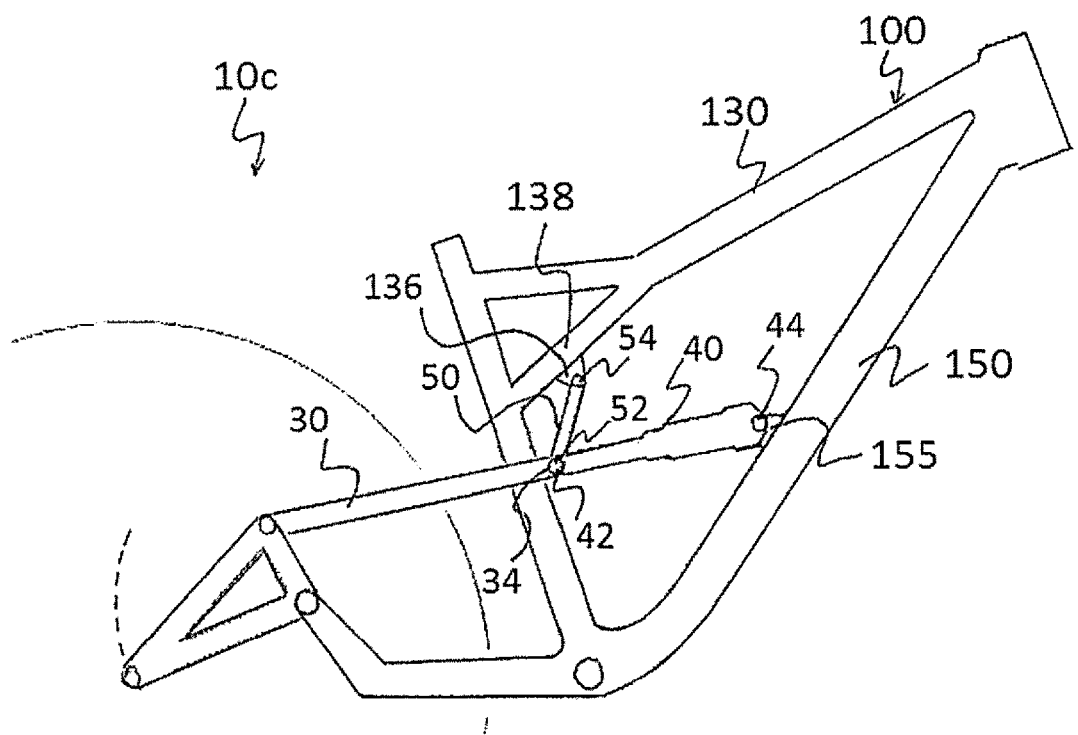
FIG. 4 is a schematic representation of a bicycle rear wheel suspension system according to a fourth embodiment of the invention.

Referring now to FIG. 4, where there is illustrated a bicycle rear wheel suspension system 10c according to a fourth embodiment. In this embodiment, a shock absorber 40 is positioned in the suspension system 10 between the seat stay 30 and the down tube 150 of the frame 100. A first end 42 of the shock 40 is pivotally connected to the seat stay 30 while a second end 44 of the shock 40 is pivotally connected to an attachment lug 155 which juts out from the down tube 150. The first end 42 of the shock 40 is also pivotally connected to a first end 52 of a rocker link 50 that is pivotally attached at a second end 54 to an attachment lug 136 which juts downward from the top tube 130 of the frame 100. The attachment lug 136 forms part of a lower section 138 of the top tube 130. The rocker link 50 is used to control the pivoting action of the shock 40 throughout suspension travel. Both the top tube 130 and seat tube 120 are of conventional design (not split). Rocker link 50 is illustrated mounted above the shock 40, although it can also be mounted below the shock 40. The rear wheel 5 of the suspension system of FIG. 4 has a 150 mm vertical travel and the shock has 57 mm of travel which provides an overall shock leverage ratio of approximately 2.63:1 throughout suspension travel. The rear wheel travel path has the same characteristics as described in relation to the first embodiment due to the configuration of the main pivot point on the chain stay.

Figure 5:
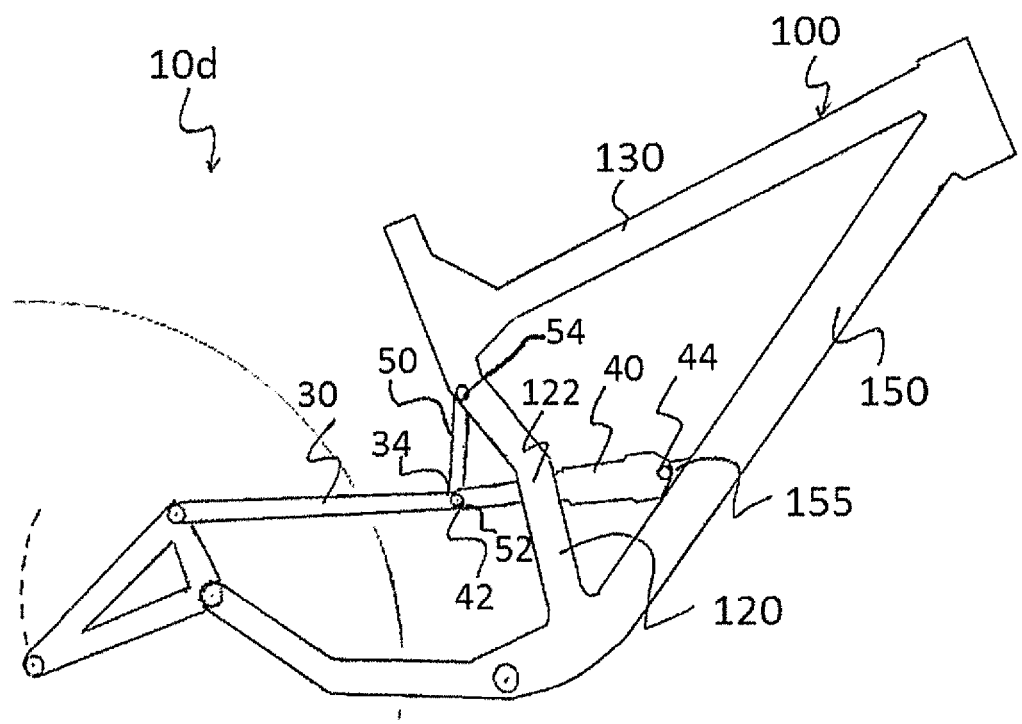
FIG. 5 is a schematic representation of a bicycle rear wheel suspension system according to a fifth embodiment of the invention.

Referring now to FIG. 5, where there is illustrated a bicycle rear wheel suspension system 10d according to a fifth embodiment. In this embodiment, a shock absorber 40 is positioned in the suspension system 10 between the seat stay 30 and the down tube 150 of the frame 100. A first end 42 of the shock 40 is pivotally connected to the seat stay 30 while a second end 44 of the shock 40 is pivotally connected to an attachment lug 155 which juts out from the down tube 150. The first end 42 of the shock 40 is also pivotally connected to a first end 52 of a rocker link 50 that is pivotally attached at a second end 54 to the seat tube 120 of the frame 100. The rocker link 50 is used to control the pivoting action of the shock 40 throughout suspension travel. In this embodiment, the seat tube 120 has a split region 122 allowing passage of the shock 40 there through. The second end 54 of the rocker link 50 is pivotally mounted inside the seat tube 120 in the split region 122. Rocker link 50 is illustrated mounted above the shock 40, although it can also be mounted below the shock 40. The rear wheel 5 of the suspension system 10 of FIG. 5 has a 150 mm vertical travel and the shock has 57 mm of travel which provides an overall shock leverage ratio of approximately 2.63:1 throughout suspension travel. The rear wheel travel path has the same characteristics as described in relation to the first embodiment due to the configuration of the main pivot point on the chain stay.

Figure 6:
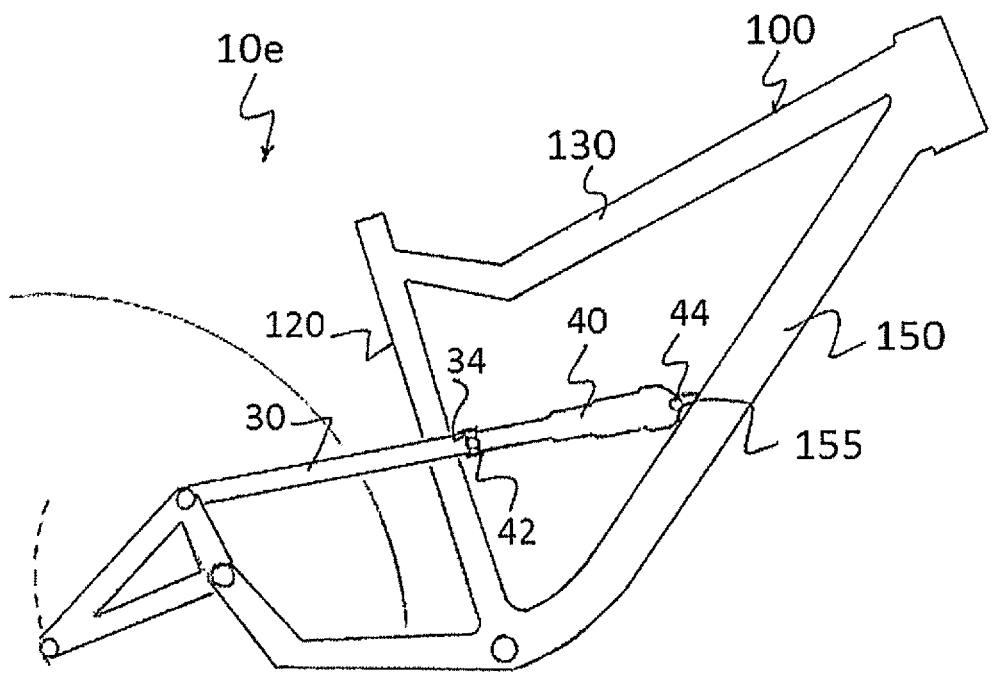
FIG. 6 is a schematic representation of a bicycle rear wheel suspension system according to a sixth embodiment of the invention.

Referring now to FIG. 6, where there is illustrated a bicycle rear wheel suspension system 10e according to a sixth embodiment of the invention. In this embodiment, a shock absorber 40 is positioned in the suspension system 10 between the seat stay 30 and the down tube 150 of the frame 100. A first end 42 of the shock 40 is fixedly connected to the seat stay 30 while a second end 44 of the shock 40 is pivotally connected to an attachment lug 155 which juts out from the down tube 150. In this embodiment, both the top tube 130 and seat tube 120 are of conventional design (not split). The rear wheel 5 of the suspension system of FIG. 6 has a 150 mm vertical travel and the shock has 57 mm of travel which provides an overall shock leverage ratio of approximately 2.63:1 throughout suspension travel. The rear wheel travel path has the same characteristics as described in relation to the first embodiment due to the configuration of the main pivot point on the chain stay.

Figure 7:
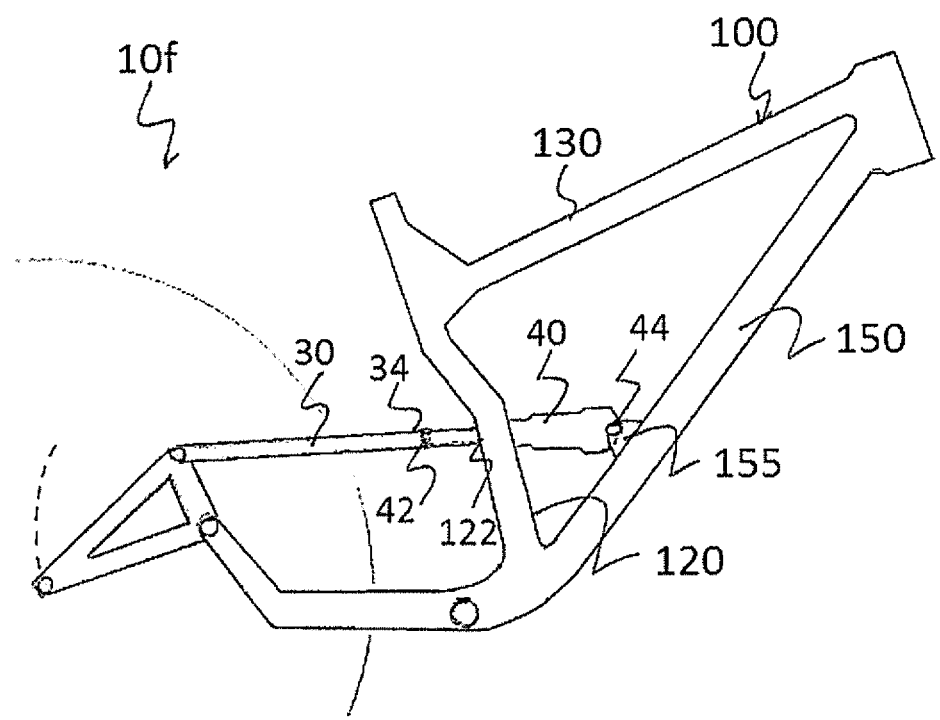
FIG. 7 is a schematic representation of a bicycle rear wheel suspension system according to a seventh embodiment of the invention.

Referring now to FIG. 7, where there is illustrated a bicycle rear wheel suspension system 10f according to a seventh embodiment. The configuration in FIG. 7 differs from that shown in FIG. 6 only in that the seat tube 120 has a split region 122 allowing passage of the shock 40 there through. The rear wheel 5 of the suspension system 10 of FIG. 7 has a 150 mm vertical travel and the shock has 57 mm of travel, which provides a shock leverage ratio of approximately 2.63:1 throughout suspension travel. The rear wheel travel path has the same characteristics as described in relation to the first embodiment, due to the configuration of the main pivot point on the chain stay.

Figure 8:
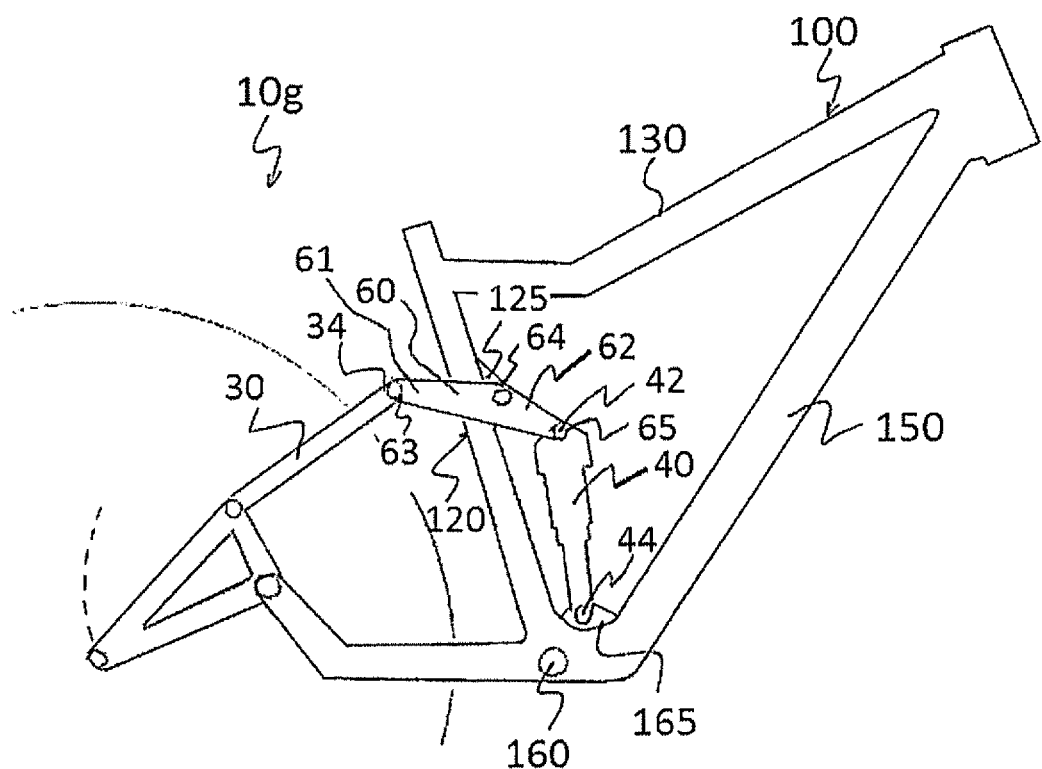
FIG. 8 is a schematic representation of a bicycle rear wheel suspension system according to an eighth embodiment of the invention.

Referring now to FIG. 8, where there is illustrated a bicycle rear wheel suspension system 10g according to an eighth embodiment of the invention. In this embodiment, a shock absorber 40 is oriented substantially vertically and pivotally mounted to an attachment lug 165 located above the bottom bracket 160. In this embodiment, the shock absorber 40 is indirectly connected to a seat stay 30 via an additional rocker link 60, itself a single rigid structure which pivots near its centre point 64. Pivot point 64 is attached to lug 125 which juts out from seat tube 120. The rocker link 60 has a first section 61 that is pivotally connected to the seat stay 30 at pivot point 63 and a second section 62 that is pivotally connected to the shock 40 at pivot point 65. In this embodiment, both the top tube 130 and seat tube 120 are of conventional design (not split). The rear wheel 5 of the suspension system of FIG. 8 has a 150 mm vertical travel and the shock has 57 mm of travel which provides an overall shock leverage ratio of approximately 2.63:1 throughout suspension travel. The rear wheel travel path has the same characteristics as described in relation to the first embodiment due to the configuration of the main pivot point on the chain stay.

Figure 9:
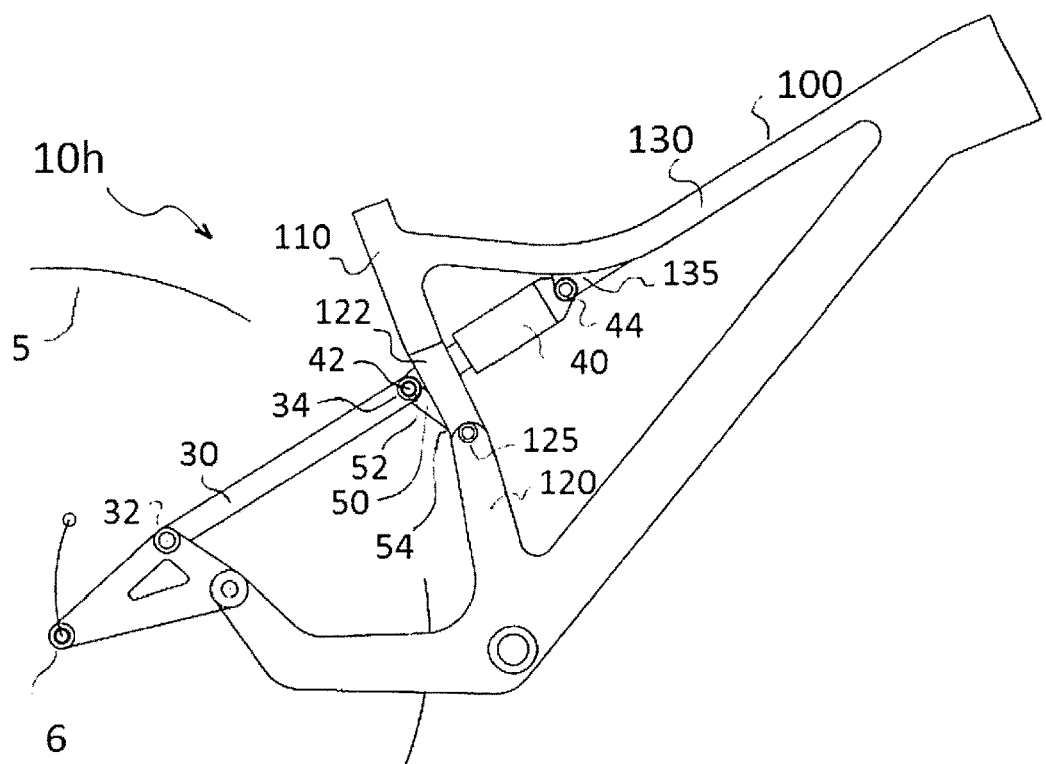
FIG. 9 is a schematic representation of a bicycle rear wheel suspension system according to a ninth embodiment of the invention.

Referring now to FIG. 9, where there is illustrated a bicycle rear wheel suspension system 10h according to a ninth embodiment. In this embodiment, a first end 42 of a shock absorber 40 is pivotally connected to seat stay 30 while a second end 44 of the shock 40 is pivotally connected to an attachment lug 135 which juts downward from top tube 130 of the frame 100. In order to control movement of the shock 40 and/or increase rear wheel lateral stiffness, a rocker link 50 is introduced to the suspension system 10. A first end 52 of the rocker link 50 is pivotally connected to the first end 42 of the shock 40 while a second end 54 of the rocker link 50 is pivotally connected to the seat tube 120 at pivot point 125. The rocker link 50 can therefore be used to control the pivoting action of the shock 40 throughout suspension travel. The top tube 130 is of conventional design (not split), while the seat tube 120 has a split section 122 to allow the passage of the shock 40 and rocker link 50 there through. Rocker link 50 is illustrated mounted below the shock 40, although it can also be mounted above the shock 40. The rear wheel 5 of the suspension system of FIG. 9 has a 110 mm vertical travel and the shock has 51 mm of travel which provides an overall shock leverage ratio of approximately 2.16:1 throughout suspension travel. The rear wheel travel path has similar characteristics as described in relation to the first embodiment due to the configuration of the main pivot point on the chain stay.

Terminal end 42 of shock 40 is here drawn in line with terminal end 52 of rocker link 50. It is possible and in some cases preferable for the terminal end 52 of rocker link 50 to pivot at a location not at the terminal end 34 of seat stay 30, but rather at another point along the seat stay 30 or at an attachment lug fixedly connected to seat stay 30. This does not affect the general claims of the features of this embodiment of the invention, and is applicable to the other embodiments of the design previously or hereafter described.

Figure 10:
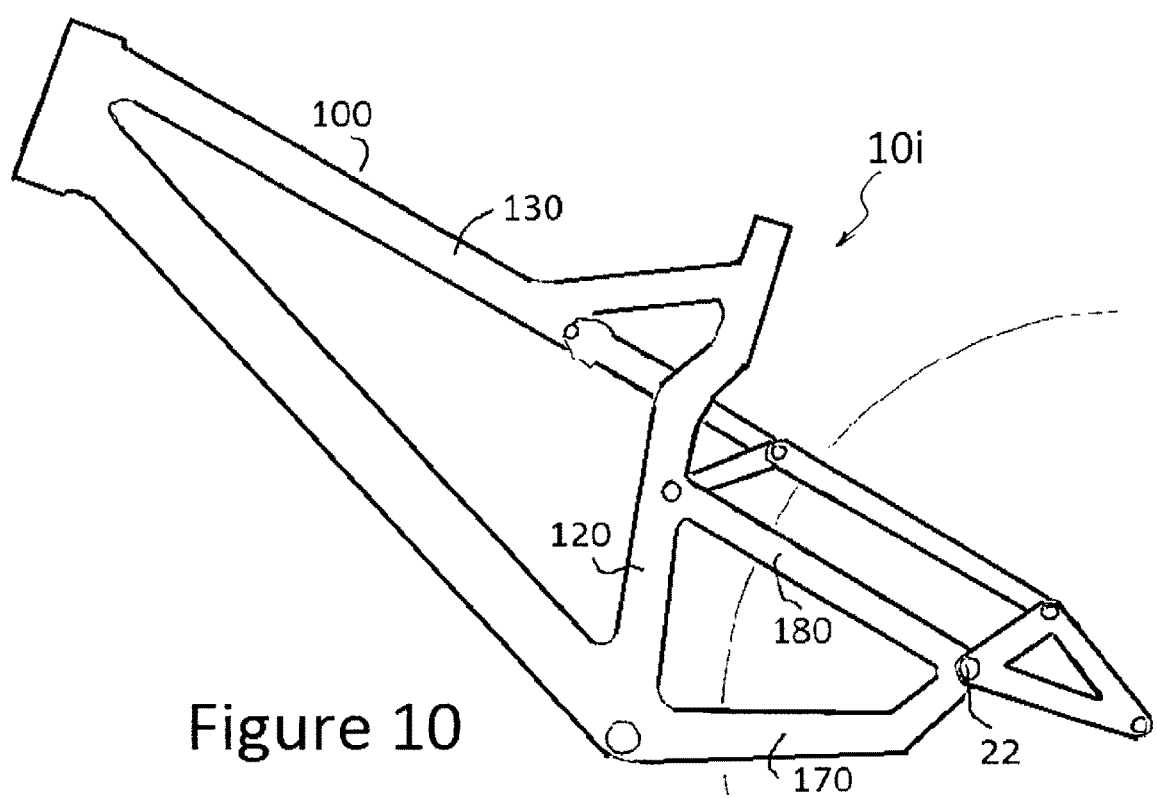
FIG. 10 is a schematic representation of a bicycle rear wheel suspension system according to a tenth embodiment of the invention.

Referring now to FIG. 10, where there is illustrated a bicycle rear wheel suspension system 10i according to a tenth embodiment. All pivot points and shock placement are similar to that of FIG. 9 except the addition of an extra rigid seat stay member 180 which exists to add extra strength, support, and rigidity to the bike frame 100, especially in the area of the main pivot point 22. The extra rigid seat stay 180 is here drawn fixedly connecting the chain stay 170 to the seat tube 120, though in certain designs it could bypass the seat tube 120 and fixedly join the chain stay 170 to the top tube 130. This extra rigid seat stay member 180 is here drawn only on the non-drive side of the bike, but it may in different embodiments of the design exist on just one, or both sides of the bike (drive, non-drive, or both). As a design feature this extra rigid seat stay member 180 may be combined with any of the other embodiments of the design previously or hereafter described.

Figure 11:
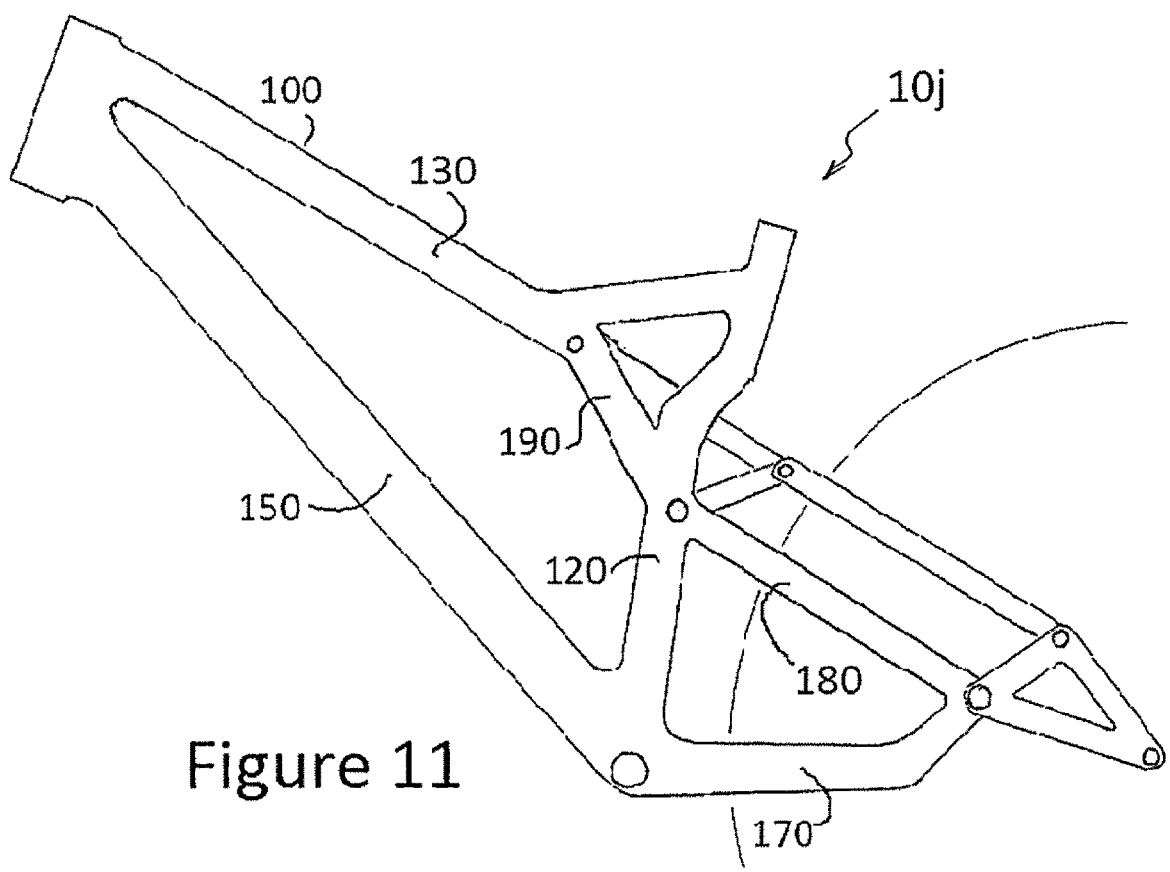
FIG. 11 is a schematic representation of a bicycle rear wheel suspension system according to an eleventh embodiment of the invention.

Referring now to FIG. 11, where there is illustrated a bicycle rear wheel suspension system 10j according to an eleventh embodiment. In this embodiment of the invention much similarity is shared with the bike depicted in FIG. 10 except the addition of an extra rigid member 190 fixedly connecting the top tube 130 with the seat tube 120. Rigid member 190 exists to add extra strength, support, and rigidity to the bike frame 100. As a design feature this extra rigid member 190 may be combined with any of the other embodiments of the design previously or hereafter described, and may in different embodiments of the design exist on just one, or both sides of the bike (drive, non-drive, or both).

Figure 12:
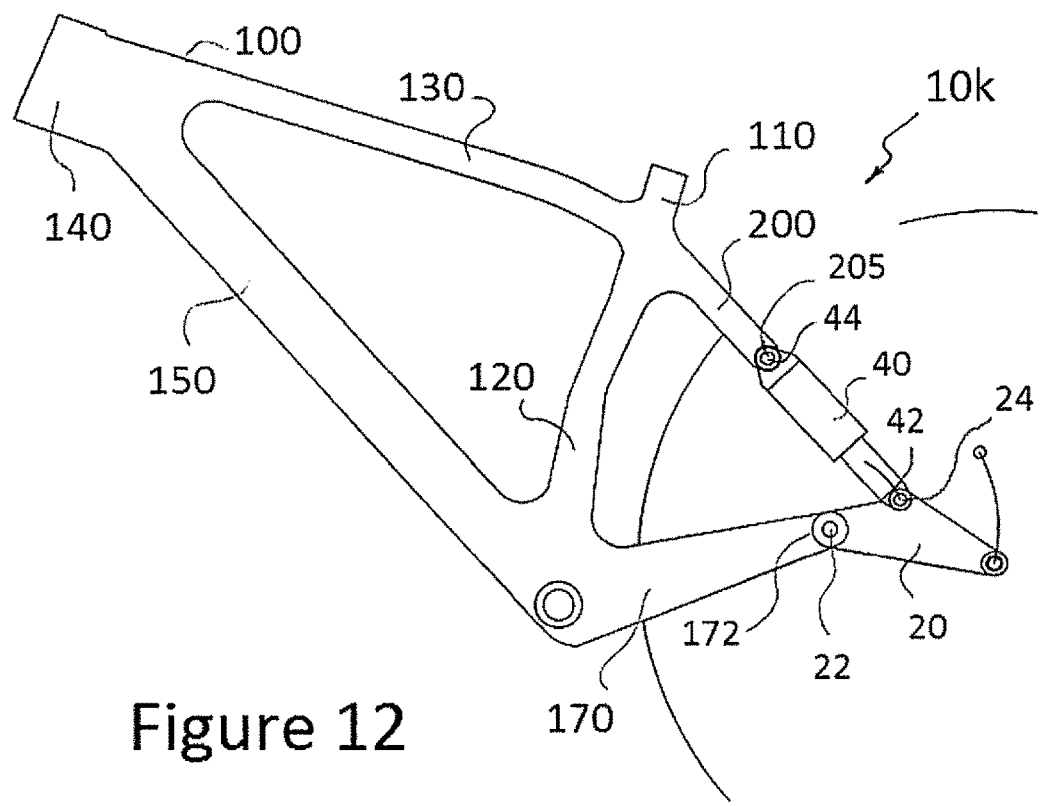
FIG. 12 is a schematic representation of a bicycle rear wheel suspension system according to a twelfth embodiment of the invention.
Figure 15:
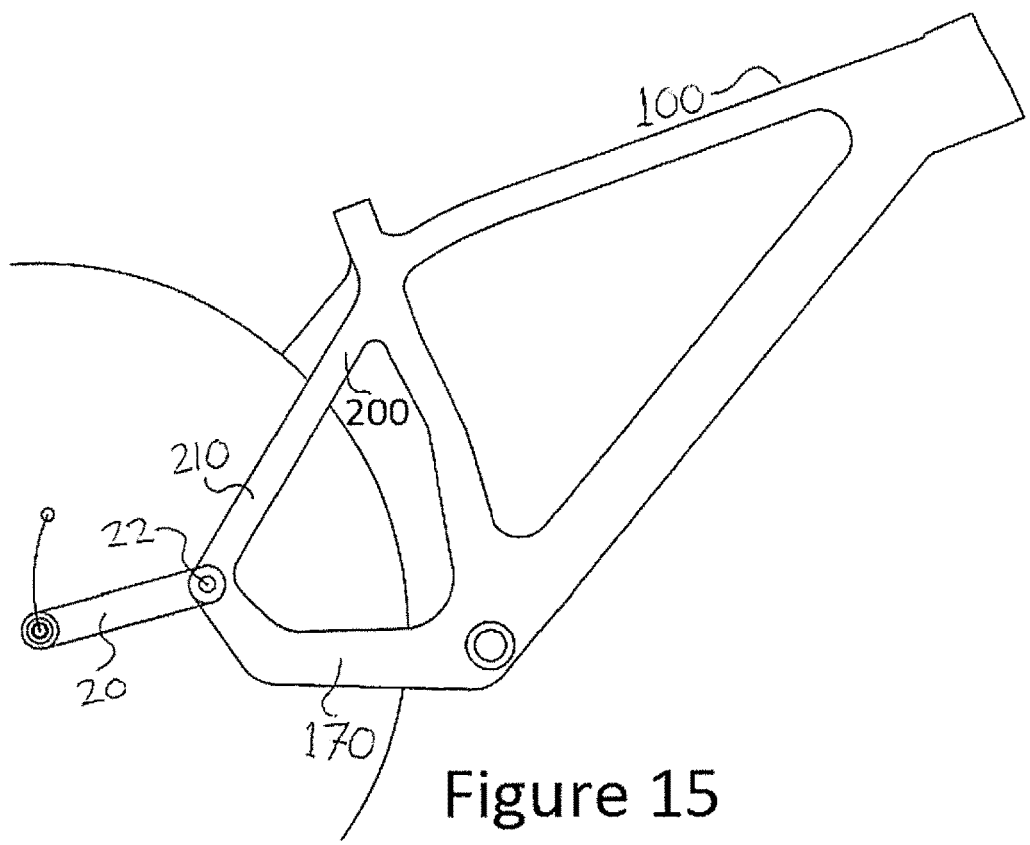
FIG. 15 is a schematic representation of the drive side of a bicycle rear wheel suspension system as it can relate to the non-drive side illustrated in previous Figures.
Figure 16:
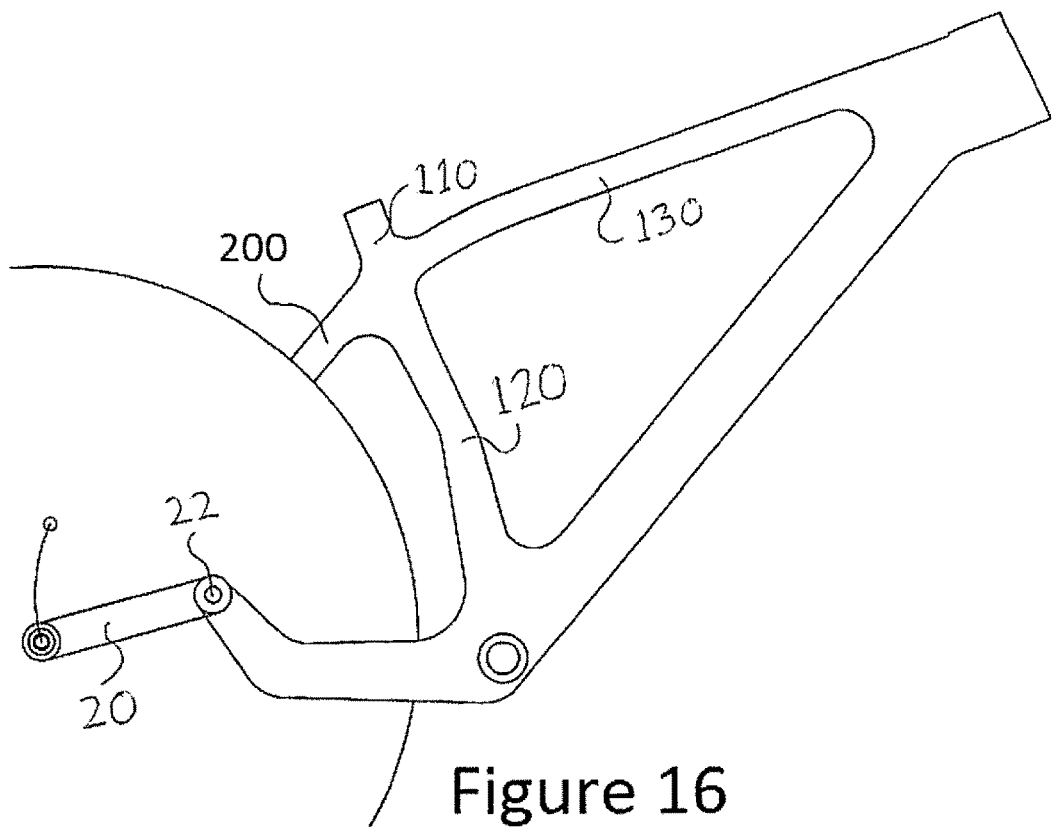
FIG. 16 is a schematic representation of the drive side of a bicycle rear wheel suspension system as it can relate to the non-drive side illustrated in FIGS. 1 through 14.
Figure 17:
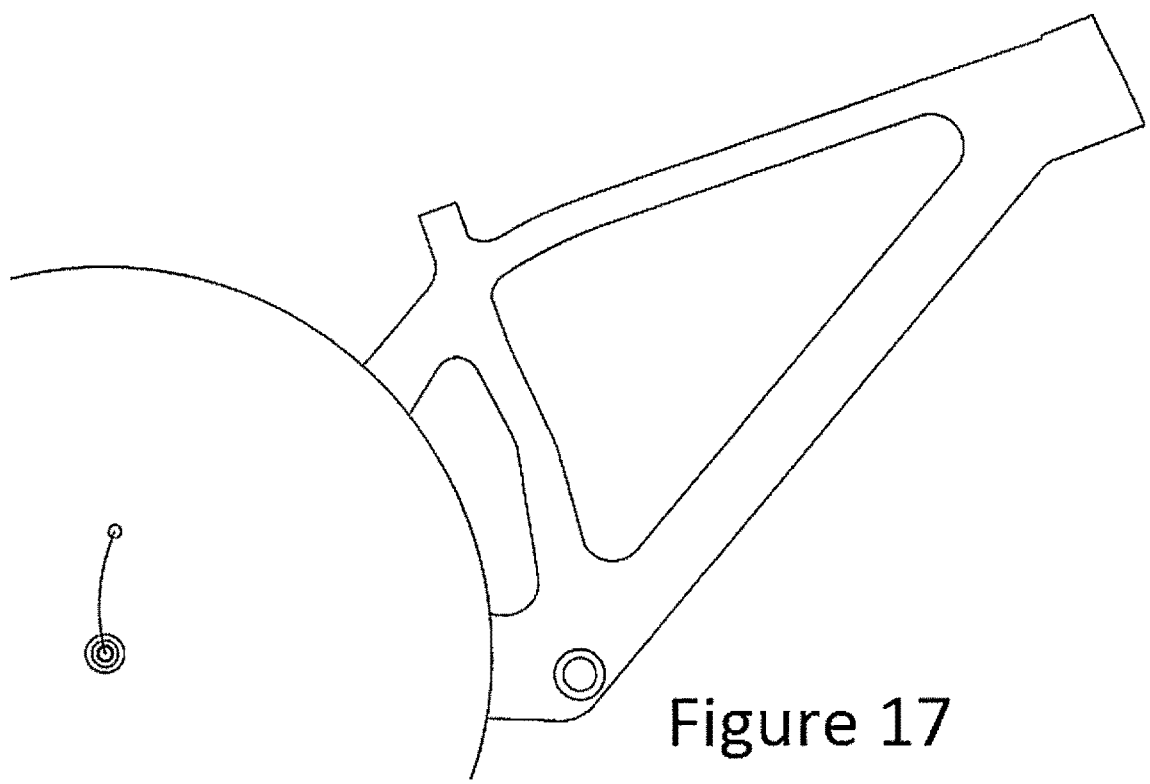
FIG. 17 is a schematic representation of the drive side of a bicycle rear wheel suspension system as it can relate to the non-drive side illustrated in FIGS. 1 through 14.

Referring now to FIG. 12, where there is illustrated a bicycle rear wheel suspension system 10k according to a twelfth embodiment of the invention. In this embodiment of the invention the bike's front triangle consisting of the head tube 140, down tube 150, top tube 130, and seat tube 120 can maintain a more 'normal' shape, reminiscent of a conventional double diamond design. Benefits include excellent triangulation of forces through the frame 100 resulting in greater strength and lighter weight, simplified manufacturing, and greater space in the area between the down tube 150, top tube 130, and seat tube 120. This greater space allows for more water bottles, tools etc. to be conveniently stored on the bike 100. The first end 42 of the shock 40 is pivotally connected to linkage member 20 at pivot point 24. The second end 44 of the shock 40 is pivotally connected to the rigid member 200 at pivot point 205. Linkage member 20 pivots about the main pivot point 22 similar to other embodiments of the invention previously described. A slight variation of this embodiment is to have the shock 40 lengthened and have the shock eyelet 44 pivotally connected to the seat tube 120. Shock 40 is here shown existing on the non-drive side of the bike, but it may in different embodiments of the design exist on just one, or both sides of the bike (drive, non-drive, or both). In this embodiment, along with the embodiments shown in FIGS. 13 and 14, the shocks 40 upper pivot point 44 rotates less than 1.6 degrees throughout the suspension movement. This results in the lowest possible unsprung weight for the shock. The rear wheel 5 of the suspension system 10 of FIGS. 15, 16, and 17 is drawn with 110 mm of vertical travel and the shock 40 has 50.5 mm of travel which provides an overall shock leverage ratio of approximately 2.18:1 throughout the suspension travel.

Figure 13:
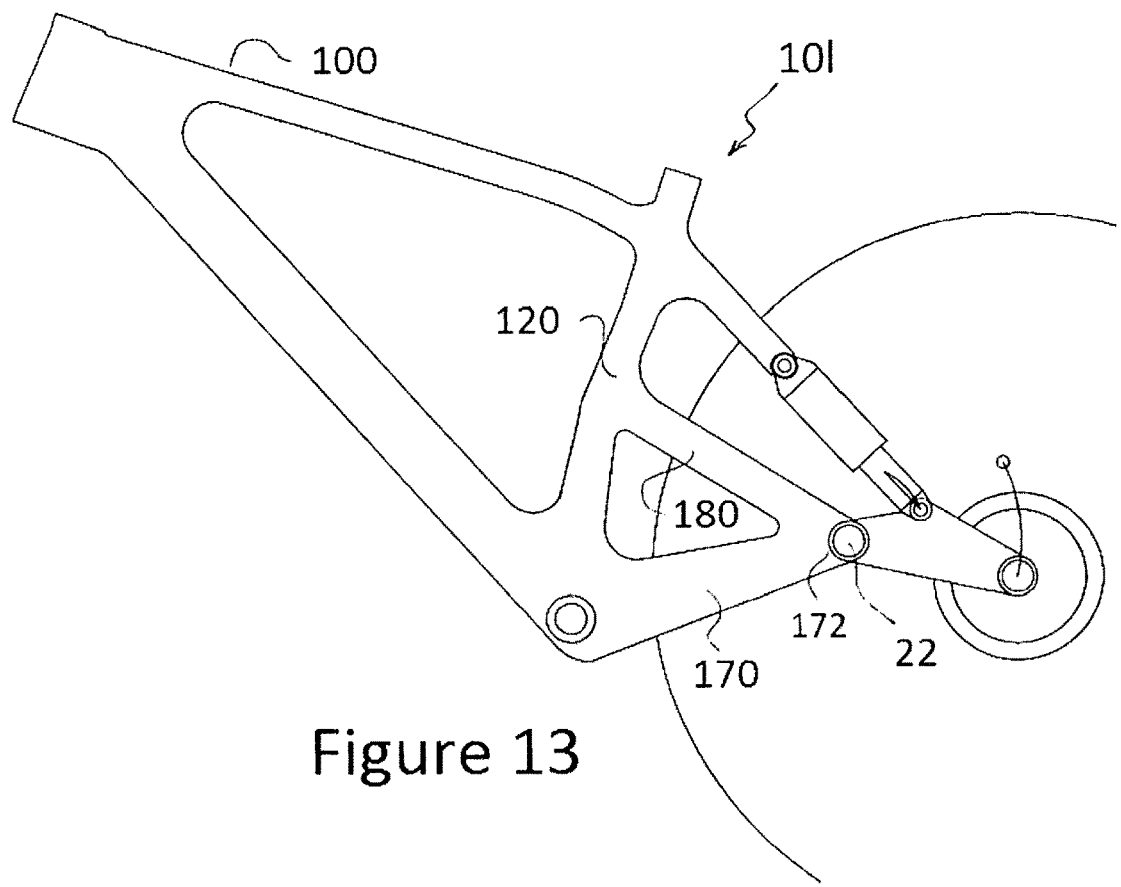
FIG. 13 is a schematic representation of a bicycle rear wheel suspension system according to a thirteenth embodiment of the invention.

Referring now to FIG. 13, where there is illustrated a bicycle rear wheel suspension system 101 according to a thirteenth embodiment of the invention. In this embodiment of the invention much similarity is shared with the bike depicted in FIG. 12 except the addition of an extra rigid member 180 connecting the end 172 of chain stay 170 with the seat tube 120. This extra rigid member 180 exists to add extra strength, support, and rigidity to the bike frame 100, especially in the area of the main pivot point 22. This extra rigid seat stay member 180 is here drawn only on the non-drive side of the bike, but it may in different embodiments of the design exist on just one, or both sides of the bike (drive, non-drive, or both). As a design feature this extra rigid seat stay member 180 may be combined with any of the other embodiments of the design previously or hereafter described.

Figure 14:
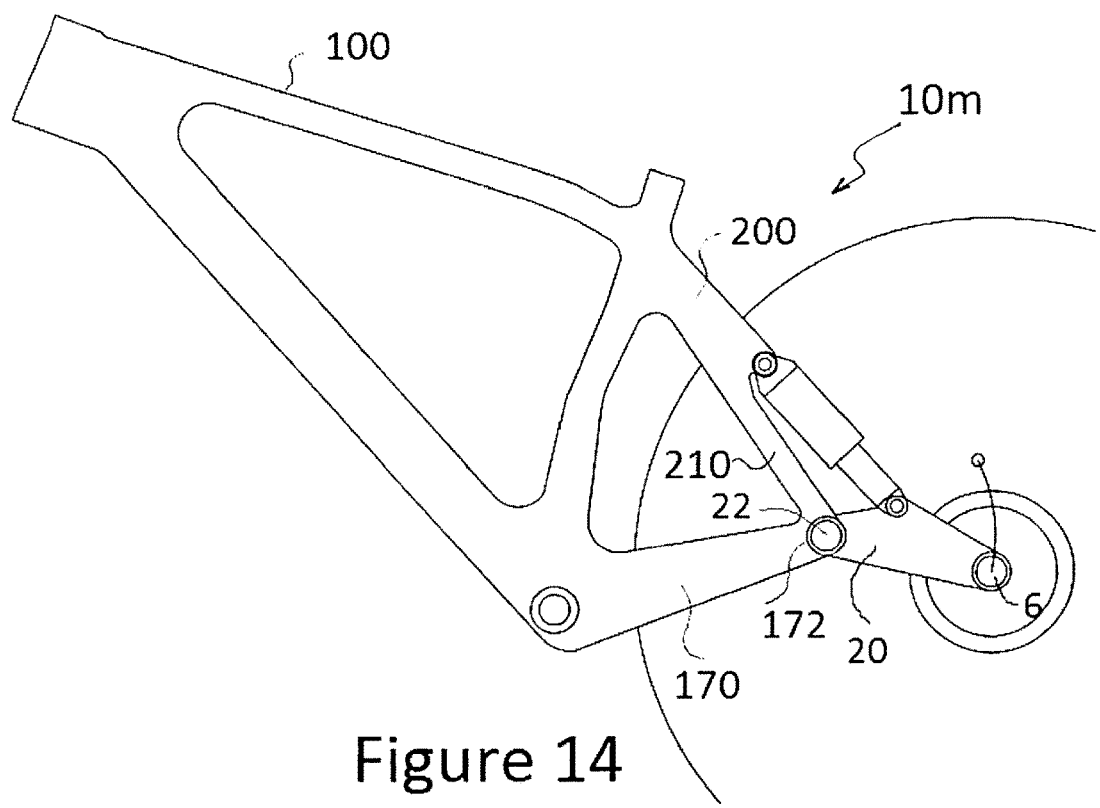
FIG. 14 is a schematic representation of a bicycle rear wheel suspension system according to a fourteenth embodiment of the invention.

Referring now to FIG. 14, where there is illustrated a bicycle rear wheel suspension system 10*m* according to a fourteenth embodiment. In this embodiment of the invention much similarity is shared with the bike depicted in FIG. 13 except the extra rigid member 180 has been substituted for an extension of the upper seat stay (or seat stays) 200. The lower extended section of the seat stay (or seat stays) 210 exist to add extra strength, support, and rigidity to the bike frame 100, especially in the area of the main pivot point 22. The lower extended section of the seat stay 210 is here drawn rigidly connecting the lower end of the upper seat stay 200 with the end 172 of the chain stay 170, though it could fixedly connect at any point along chain stay 170. This extra rigid seat stay member 210 is here drawn only on the non-drive side of the bike, but it may in different embodiments of the design exist on just one, or both sides of the bike (drive, non-drive, or both). As a design feature this lower extended section of the seat stay (seat stays) 210 may be combined with any of the other embodiments of the design previously or hereafter described.

In each of the embodiments of the invention described, the shock 40 can be flipped to a right way up or upside-down orientation without affecting the general kinematics of the suspension design as a whole.

Certain embodiments of the design can allow for the elimination of the drive side chain stay 170 and seat stay 210. This 'lefty' style design would have benefits such as completely eliminating chain slap when riding over bumpy terrain, and allowing greater heel clearance when pedalling. Greater heel clearance can itself lend to the use of cranksets with narrower Q-factor which some rider's favour. Simplified manufacturing leading to reduced cost is also possible. Certain areas of the bike around the rear wheel and drive train would be easier to service, clean and maintain also. Greater strength and rigidity to resist twisting forces encountered at the rear hub axle 6—linkage member 20 interface, and main pivot point 22, would be required. This can be overcome with a specially designed rear hub and axle to suit this embodiment. A special design incorporated into the rear hub axle may be required for a rear derailleur mount. A larger more robust main pivot point 22 design may be required also. The embodiments of the design as depicted in FIGS. 12, 13, and 14 are most conducive to this 'lefty' style of the design.

Three drawings depicting the drive side of the bicycle are now shown for the purpose of adding clarification to some of the descriptions previously made. They do not exhaustively or comprehensively represent all the options available or previously described and are not intended as a limiting factor regarding the claims previously made, but are added to provide a visual aid for understanding the descriptions previously made.

In FIG. 15, the drive side of the bike is depicted with the front triangle similar to that previously drawn in FIGS. 12, 13, and 14. The drive side of the bicycle is here depicted with the chain stay 170 rigidly connected to the lower end 210 of the rigid seat stay 200. Linkage member 20 pivots about the main pivot point 22 similar to other embodiments of the invention previously described. As the shock 40 exists only on the non-drive side of the bicycle in this embodiment, no more pivot points are required on the drive side. The rigid connection between the chain stay 170 and the seat stay 210/200 exists to add extra strength, support, and rigidity to the bike frame 100, especially in the area of the main pivot point 22. Only four pivot points are required for this embodiment. The elimination of all but one (main pivot point 22) pivot points on the drive side of the bike adds simplicity, reduces cost, and reduces the weight the bike.

In FIG. 16, the drive side of the bike is depicted with the front triangle similar to that previously drawn in FIGS. 12, 13, and 14. The drive side of the bicycle is here depicted without the rigid member 210 to triangulate the forces from the area around the main pivot point 22 to the upper seat stays 200, upper seat tube 110, middle or main section of seat tube 120, or top tube 130. Linkage member 20 pivots about the main pivot point 22 similar to other embodiments of the invention previously described. As the shock 40 exists only on the non-drive side of the bicycle in this embodiment, no more pivot points are required on the drive side.

In FIG. 17, the drive side of the bike is depicted with the front triangle similar to that previously drawn in FIGS. 12, 13, and 14. The drive side of the bicycle is here depicted without the lower section of seat stay—rigid member 210, or the chain stay—rigid member 170 and the linkage member 20 that pivoted about the main pivot point 22 on the drive side of the bicycle. A special hub mounted derailleur mount would likely be required for this design to work efficiently when combined with a conventional crankset, cassette, and rear derailleur system as currently favoured by the majority of professional rider's in mountain biking Some of the benefits and engineering difficulties of this embodiment of the design have been previously described. Only three pivot points are required with this embodiment.

Figure 18:
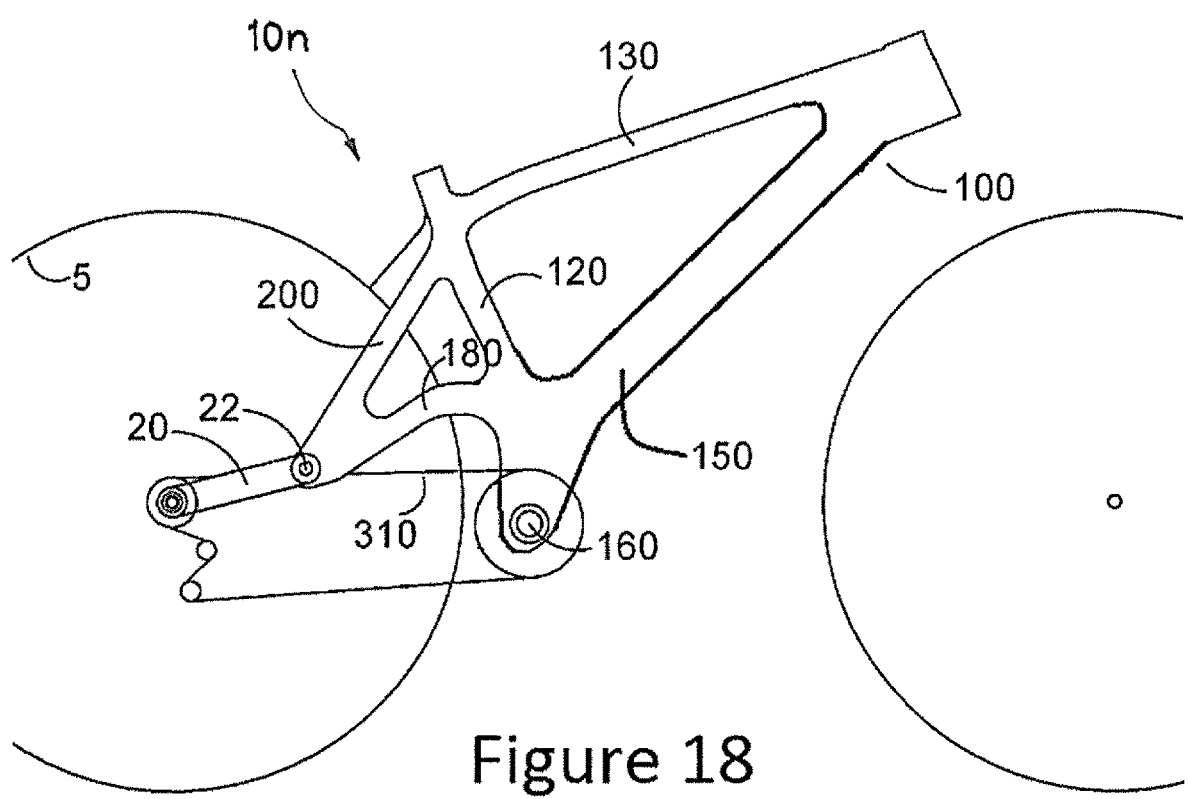
FIG. 18 is a schematic representation of a bicycle rear wheel suspension system according to a fifteenth embodiment of the invention.

Referring now to FIG. 18, where there is illustrated a bicycle rear wheel suspension system 10*n* according to a fifteenth embodiment. In this embodiment of the invention much similarity is shared with the bikes depicted in FIGS. 12, 13, and 14. The brake side (left side) of the bike may resemble any of the previous Figures. The drive side of the bike is here depicted with an extra rigid member 180 connecting the area of the main pivot point 22 to the bike's main frame. Rigid member 180 is here depicted connecting to the seat tube 120 though it may also fixedly connect to the down tube 150, or the bottom bracket area 160. This extra rigid member 180 exists to add extra strength, support, and rigidity to the bike frame 100, especially in the area of the main pivot point 22. The location of extra rigid member 180 in FIG. 18 is such that the chain 310 of the bicycle 100 passes below the rigid member 180. The benefit of this is that the rear wheel 5 and chain 310 of the bicycle can be removed without the need to break the chain 310. This allows for ease of servicing and is conducive and favourable for belt drives also. The absence of a normal drive side chain stay (170 in previous Figures) will allow for reduced "chain slap" of the chain 310 against the bike frame 100. Chain slap is common when riding over rough surfaces and can cause unwanted noise, and/or damage to the bike frame 100. The absence of a normal drive side chain stay 170 will also eliminate chain 310 contact on frame 100 and chain slap as a limiting design factor for the invention, and may prove especially beneficial in longer travel embodiments of the invention. This extra rigid seat stay member 180 is here drawn only on the drive side of the bike, but it may in different embodiments of the invention exist on just one, or both sides of the bike (drive, non-drive, or both). As a design feature this extra rigid seat stay member 180 may be combined with any of the other embodiments of the design previously described. The lower portion of the down tube 150 of the bike frame 100 is here drawn connecting to the seat tube 120 at an area above the line of the bottom bracket 160. With certain construction techniques this may prove to be superior to having a more conventional connection point of the down tube 150 to the bottom bracket area 160, and may be combined with any of the other embodiments of the design previously described.

Figure 19:
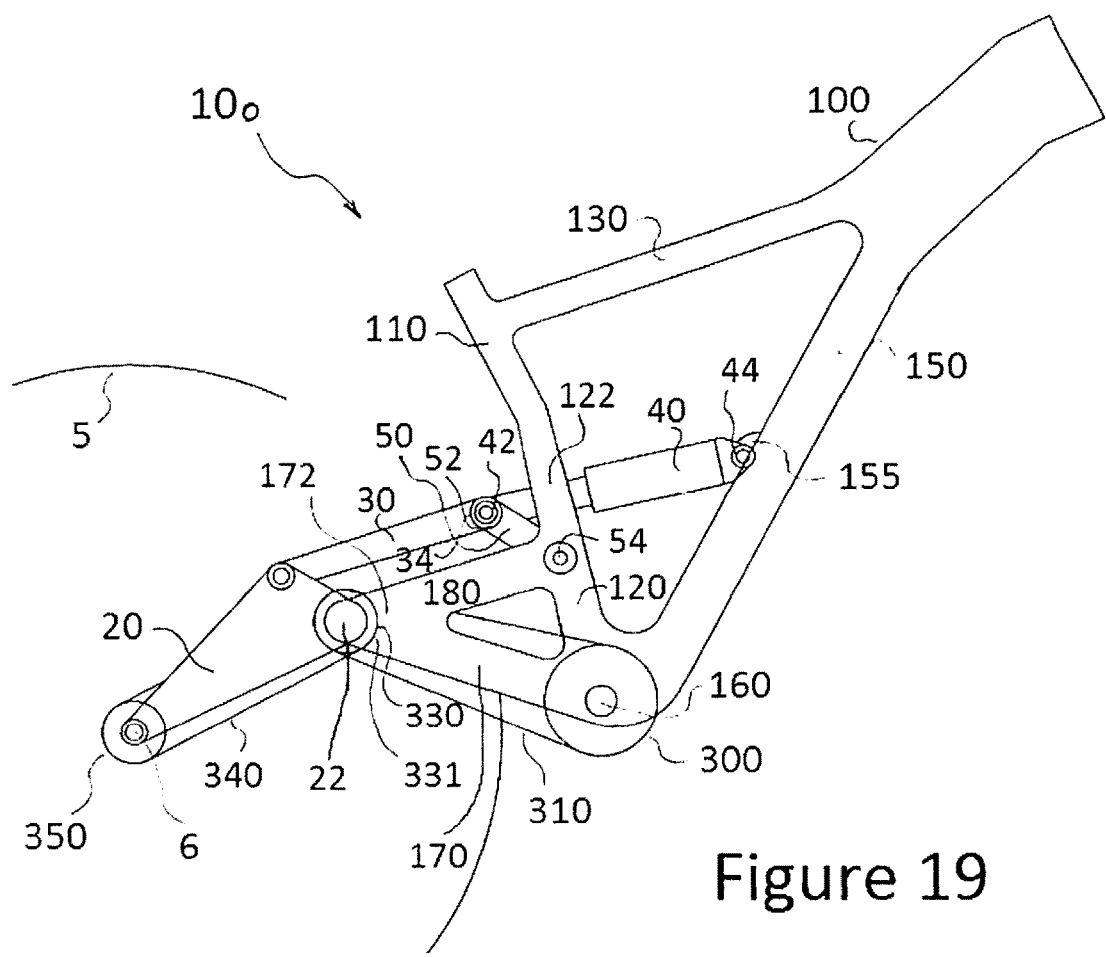
FIG. 19 is a schematic representation of a bicycle rear wheel suspension system according to a sixteenth embodiment of the invention.

Referring now to FIG. 19, where there is illustrated a bicycle rear wheel suspension system 10o according to a sixteenth embodiment. This embodiment of the design has favourable characteristics for long travel suspension designs especially common in downhill mountain biking Maximizing the desirable traits of a full suspension system such as a favourable rear wheel travel path and minimal unsprung weight is traditionally met with limitations that often lead to undesirable traits such as chain growth and the accompanying pedal kickback that may increase proportionately to the increase in desirable traits—somewhat offsetting any performance gains. The longer the travel of the suspension design, the greater these problems and limitations can become. FIG. 19 illustrates just one possible embodiment of the design that can allow for the most desirable traits of the suspension system 10 to be maximized, such as a very rearward initial rear axle 6 travel path, while the chain growth and accompanying pedal kickback is kept to an absolute minimum. This can be achieved while maintaining the integrity of the invention that relates to the position of the main pivot point 22.

In FIG. 19, the bike is drawn with shock absorber 40 positioned in the suspension system 10n between the seat stay 30 and the down tube 150 of the frame 100. A first end 42 of the shock 40 is pivotally connected to the seat stay 30 while a second end 44 of the shock 40 is pivotally connected to an attachment lug 155 which juts out from the down tube 150. The first end 42 of the shock 40 is also pivotally connected to a first end 52 of a rocker link 50 that is pivotally attached at a second end 54 to the seat tube 120 of the frame 100. The rocker link 50 is used to control the pivoting action of the shock 40, and/or provide additional lateral stiffness throughout suspension travel. In this embodiment, the seat tube 120 has a split region 122 allowing passage of the shock 40 there through. The second end 54 of the rocker link 50 is pivotally mounted inside the seat tube 120 in the split region 122, though it could also attach to a lug fixedly attached to the seat tube 120. Rocker link 50 is illustrated mounted below the shock 40, although it can also be mounted above the shock 40. A rigid member 180 is here drawn rigidly connecting the chain stay 170 to the seat tube 120, though it could also connect to the upper seat tube 110 or the top tube 130, or be eliminated entirely. The rear wheel 5 of the suspension system 10n of FIG. 19 is drawn with 205 mm of vertical travel and the shock 40 has 85 mm of travel which provides an overall shock leverage ratio of approximately 2.41:1 throughout the suspension travel. The rear wheel travel path has the same characteristics as described in relation to the first embodiment due to the configuration of the main pivot point 22 on the chain stay. The initial rear axle 6 travel path is extremely rearward for the most excellent bump absorption qualities, particularly when encountering square edged bumps. The undesirable chain growth that normally accompanies such a rearward rear axle travel path is overcome by combining the qualities of the location of the main pivot point 22 (unique to the invention) with a modified drive train system. One option for the modified drive train system as it accompanies the invention shall now be explained.

The rider pedals the bike as per normal and the front cog 300 rotates in response to the rider's pedalling force. The bike's chain or belt drive is not routed directly to the rear cogs (cassette) 350 as on most traditional bikes but is rather routed to a middle cog 330 that rotates about the axis of the main pivot point 22. A second middle cog 331 is fixedly connected to the cog 330 directly or by an axle. These two middle cogs both rotate on the axis of the main pivot point 22 and can be located side by side, or separated by a small gap possibly on either side of the linkage member 20 and the end 172 of the chain stay 170 at the location of the main pivot point 22. The cog 331 is connected to the rear cog 350 by a second chain or belt drive 340. So the rider's pedalling forces drive the front cog 300 which drives the first chain or belt drive 310 which drives the middle cog 330. The rigid connection between the two middle cogs 330 and 331 means that the rotating of middle cog 330 will also cause the second middle cog 331 to rotate. The rotation of the middle cog 331 drives the second chain or belt drive 340 that rotates the rear cog 350 that propels the bike forwards.

Some of the benefits of this embodiment shall now be explained. The distance between the bike's bottom bracket 160 and the pivoting axis of the second cog 330 location does not change throughout the suspension movement. The distance between the second cog 331 location and the bike's rear cog 350 does not change throughout the suspension movement. This results in zero chain growth and its undesirable accompanying pedal kickback throughout the suspension movement. The rear wheel axle travel path can thus be designed to be far more rearward than possible with conventional designs. Far superior bump absorption qualities can thus be obtained. Zero chain growth also eliminates the need for chain retention devices that are often needed on traditional suspension designs, saving weight, complexity and expense. Zero chain growth also lends itself well to the incorporation of belt drives instead of chains which have benefits relating to maintenance, cleanliness and reduced weight. When this embodiment as illustrated in FIG. 19 is combined with an internally geared hub, possibly located at the bottom bracket 160, then a rear derailleur, and the full cassette of cogs normally located at the rear hub 6 can be replaced with a single cog in that location 6. The bike's transmission would thus be far less susceptible to damage in a crash. If a transmission system was installed elsewhere such as within the bottom bracket then the weight of a single cog at the rear axle 6 is far less than that of a multiple cog cassette with its derailleur. This results in a reduction in unsprung weight which allows the rear wheel 5 to accelerate faster out of the way of bumps meaning less of the rider's forward momentum is lost when encountering bumps. Other benefits common to previously illustrated embodiments of the design are maintained such as the reduced unsprung weight of linkage member 20 when compared against traditional designs with a full length chain stay of unsprung weight.

As a design feature this modified drive train may be combined with any of the other embodiments of the design previously or hereafter described.

Figure 20:
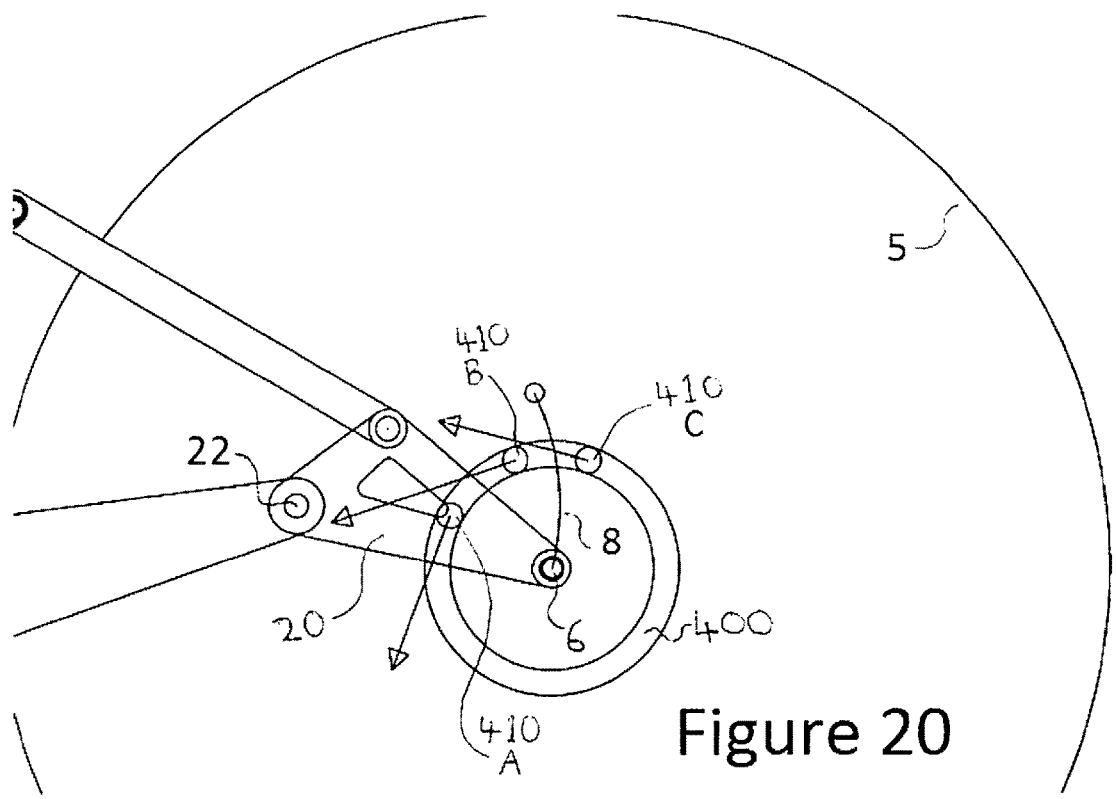
FIG. 20 is a schematic representation of a bicycle rear wheel suspension system as it performs under the influence of rear wheel braking.

FIG. 20 illustrates a brief analysis of the inventions suspension performance when the rear brake is applied. A disc brake rotor 400 is fixedly connected to the rear wheel 5 which rotates about the axis of the rear wheel axle 6. The vector of the force that is exerted on the bike's frame 100, and its effect on the bike's rear suspension when the rear brake is applied is determined by the position of the rear brake calliper 410, relative to the position of the bike's main pivot point 22.

With the brake calliper 410 in position A, the vector of the force exerted on the calliper by the disc brake rotor 400 when the rear brake is applied, points significantly below the position of the main pivot point 22. This results in a force that will cause the linkage member 20 to push downward when the rear brake is applied. This will cause the bike's suspension to "jack" or raise itself in response to the braking force. With the brake calliper 410 in position C, the vector of the force exerted on the calliper by the disc brake rotor 400 when the rear brake is applied, points significantly above the position of the main pivot point 22. This results in a force that will cause the linkage member 20 to push upward when the rear brake is applied. This will cause the bike's suspension to "squat" or compress in response to the braking force. With the brake calliper 410 in position B, the vector of the force exerted on the calliper by the disc brake rotor 400 when the rear brake is applied, points just slightly below the position of the main pivot point 22. This results in a force that will cause the linkage member 20 to push slightly downward when the rear brake is applied. This will cause the bike's suspension to "jack" or rise slightly in response to the braking force. Controlling or modifying the braking characteristics as it relates to the invention is thus simple and highly tunable when compared against contemporary designs. Moreover, with the brake calliper 410 in position B, the bike's slight desire to jack when the rear brake is applied can be used to counteract the force of the rear tyre pulling hard on the ground when the rear brake is applied. By virtue of having a rear wheel axle 6 travel path 8 that is initially rearward and upward, the braking force of the tyre pulling on the ground causes the rear wheel 5 to want to squat when the rear brake is applied. Positioning the brake calliper 410 so that the vector of force exerted on it from the disc brake rotor 400 to cancel the undesirable jack force caused by the rear tyre pulling on the ground, is both simple and effective.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A bicycle rear wheel suspension system comprising a frame comprising a bottom bracket and a first chain stay, the system further comprising a rear wheel comprising an axle, and a first linkage member pivotally connected with respect to the first chain stay at a first main pivot point, the first linkage member extending rearwardly from the main pivot point to bridge the main pivot point and the axle, wherein the main pivot point is in a position higher than the bottom bracket, and closer to the axle than the main pivot point is to the bottom bracket, wherein at least the first linkage member further comprises a pivotable connection point for a shock absorbing mechanism bridging the pivotable connection point and a portion of a remainder of the frame, wherein the first main pivot point, the axle, and the pivotable connection point for the shock absorbing mechanism comprise a triangular geometry on the first linkage member, wherein the pivotable connection point for the shock absorbing mechanism is higher than the main pivot point, and wherein the axle is rearward of the pivotable connection point for the shock absorbing mechanism.

2. The bicycle rear wheel suspension system of claim 1, wherein the first linkage member is a triangular shaped member comprising the first main pivot point at or near a first corner thereof, the axle at or near a second corner thereof, and the pivotable connection point for the shock absorbing mechanism at or near a third corner thereof.

3. The bicycle rear wheel suspension system of claim 1, wherein the frame further comprises a second chain stay, and wherein the system further comprises a second linkage member pivotally connected with respect to the second chain stay at a second main pivot point, where the second main pivot point is substantially identically positioned as, and aligned with, the first main pivot point, and wherein the second linkage member extends rearwardly, to bridge the second main pivot point and the axle.

4. The bicycle rear wheel suspension system of claim 3, wherein the first and second linkage members are substantially identical.

5. The bicycle rear wheel suspension system of claim 3, wherein the first and second linkage members are dissimilar.

6. The bicycle rear wheel suspension system of claim 5, wherein the second linkage member does not comprise a pivotable connection point for the shock absorbing mechanism.

7. The bicycle rear wheel suspension system of claim 3, wherein one side of the system comprises the first chain stay sprung, a sprung first seat stay, the first linkage member unsprung, and the shock absorbing mechanism, while an opposing side features the second chain stay sprung, a sprung second seat stay, and the second linkage member unsprung.

8. The bicycle rear wheel suspension system of claim 3, wherein one side of the system comprises the first chain stay sprung, the first linkage member unsprung, and the shock absorbing mechanism, while the opposing side features the second chain stay sprung, and the second linkage member unsprung.

9. The bicycle rear wheel suspension system of claim 3, wherein one side of the system comprises the first chain stay sprung, a sprung first seat stay, the first linkage member, and the shock absorbing mechanism, while the opposing side features the second chain stay sprung, and the second linkage member unsprung.

10. The bicycle rear wheel suspension system of claim 1, wherein the pivotable connection point for shock absorbing mechanism bridges with the first linkage member, and a further pivotable connection with respect to a top tube of the frame.

11. The bicycle rear wheel suspension system of claim 1, wherein the shock absorbing mechanism comprises a shock absorber.

12. The bicycle rear wheel suspension system of claim 11, wherein the shock absorbing mechanism comprises at least one shock absorber linkage bridging the shock absorber and one of either of the shock absorbing mechanism's pivotable connection point with the first linkage member, or a further pivotable connection with respect to a top tube of the frame.

13. The bicycle rear wheel suspension system of claim 1, wherein one side of the system comprises the first chain stay sprung, a sprung first seat stay, the first linkage member unsprung, and the shock absorbing mechanism, while the opposing side features none of those things.

14. The bicycle rear wheel suspension system of claim 1, wherein one side of the system comprises a sprung chain stay, an unsprung first linkage member, and the shock absorbing mechanism, while the opposing side features none of those things.

15. The bicycle rear wheel suspension system of claim 1, wherein the first chain stay is raised above the level of a chain.

16. A bicycle comprising a frame comprising a bottom bracket and a first chain stay, the bicycle further comprising a rear wheel suspension system comprising a rear wheel comprising an axle, and a first linkage member pivotally connected with respect to the first chain stay at a first main pivot point, the first linkage member extending rearwardly from the main pivot point to bridge the main pivot point and the axle, wherein the main pivot point is in a position higher than the bottom bracket, and closer to the axle than the main pivot point is to the bottom bracket, and wherein at least the first linkage member further comprises a pivotable connection point for a shock absorbing mechanism bridging the pivotable connection point and a portion of a remainder of the frame, wherein the first main pivot point, the axle, and the pivotable connection point for the shock absorbing mechanism comprise a triangular geometry on the first linkage member, wherein the pivotable connection point for the shock absorbing mechanism is higher than the main pivot point, and wherein the axle is rearward of the pivotable connection point for the shock absorbing mechanism.

17. A bicycle rear wheel suspension system comprising a frame comprising a bottom bracket and a first chain stay, the system further comprising a rear wheel comprising an axle, and a first linkage member pivotally connected with respect to the first chain stay at a first main pivot point, the first linkage member extending rearwardly to bridge the main pivot point and the axle, wherein the main pivot point is in a position higher than the bottom bracket, and closer to the axle than the main pivot point is to the bottom bracket, wherein at least the first linkage member further comprises a pivotable connection point for a shock absorbing mechanism bridging the pivotable connection point and a portion of a remainder of the frame, wherein the first main pivot point, the axle, and the pivotable connection point for the shock absorbing mechanism comprise a triangular geometry on the first linkage member, wherein one side of the system comprises a sprung chain stay, an unsprung first linkage member, and the shock absorbing mechanism, while the opposing side features none of those things.

* * * * *